United States Patent
Ono et al.

(10) Patent No.: US 8,671,504 B2
(45) Date of Patent: Mar. 18, 2014

(54) COVER OF VEHICLE OPTICAL SENSOR AND VEHICLE OPTICAL SENSOR DEVICE

(75) Inventors: Manabu Ono, Okazaki (JP); Toshihiro Hattori, Okazaki (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 13/093,975

(22) Filed: Apr. 26, 2011

(65) Prior Publication Data

US 2011/0266375 A1    Nov. 3, 2011

(30) Foreign Application Priority Data

Apr. 28, 2010   (JP) .................. 2010-103461
Aug. 3, 2010   (JP) .................. 2010-174448

(51) Int. Cl.
*B08B 3/00*   (2006.01)

(52) U.S. Cl.
USPC .............. 15/250.04; 15/250.001; 15/250.002; 15/250.01; 15/250.05

(58) Field of Classification Search
USPC ....................... 15/250.001–250.05
See application file for complete search history.

(56) References Cited

U.S. PATENT DOCUMENTS

| | | |
|---|---|---|
| 2003/0090569 A1 | 5/2003 | Poechmueller |
| 2007/0273971 A1 | 11/2007 | Waldmann et al. |
| 2009/0250533 A1 | 10/2009 | Akiyama et al. |
| 2011/0073142 A1 | 3/2011 | Hattori et al. |

FOREIGN PATENT DOCUMENTS

| | | |
|---|---|---|
| EP | 0240832 A1 | 10/1987 |
| JP | A-07-17367 | 1/1995 |
| JP | A-2000-238623 | 9/2000 |
| JP | A-2001-171491 | 6/2001 |
| JP | 2006-160103 A | 6/2006 |
| JP | A-2006-194638 | 7/2006 |
| JP | A-2007-013631 | 1/2007 |
| JP | A-2007-13632 | 1/2007 |
| JP | A-2007-053448 | 3/2007 |
| JP | A-2008-021602 | 1/2008 |
| JP | A-2008-160777 | 7/2008 |
| JP | 2009-081765 A | 4/2009 |
| JP | A-2009-225179 | 10/2009 |
| JP | A-2009-241749 | 10/2009 |

OTHER PUBLICATIONS

Office Action dated Dec. 18, 2012 issued from the Japanese Patent Office for the JP counterpart application No. 2010-174448 (English translation enclosed).
Office Action dated Jan. 4, 2012 issued in corresponding SE Application No. 1150369.5 (and English translation).
Office Action in SE Divisonal Application No. 1200536-9 dated Dec. 11, 2012 (and English translation).
Office Action mailed Apr. 24, 2012 issued in corresponding JP Application No. JP-2010-103461 (and English translation).
Office Action dated Mar. 27, 2013 in corresponding CN Patent Application No. 201110113692.7 (and English translation).

*Primary Examiner* — Shay Karls
(74) *Attorney, Agent, or Firm* — Posz Law Group, PLC

(57) ABSTRACT

A vehicle optical sensor device has a snow/ice removal orifice for jetting the cleansing fluid toward an upper space of a lens and an optical sensor cleansing orifice for jetting the cleaning fluid toward a lens surface of the lens of a camera. The jetted fluid from the snow/ice removal orifice and the optical sensor cleansing orifice removes snow/ice protruding from a sensor top cover of a case into a front upper space of the lens in an eaves shape and foreign matter on the lens surface of the lens of the camera.

28 Claims, 29 Drawing Sheets

FIG. 1A
FIG. 1B
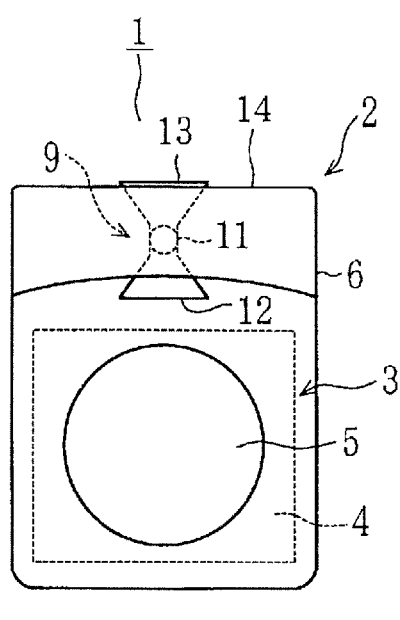
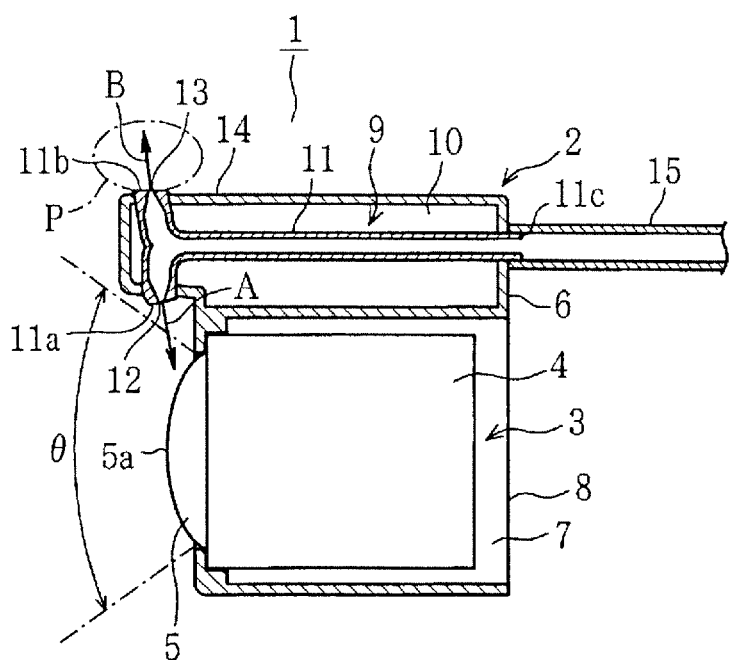

FIG. 9A
FIG. 9B
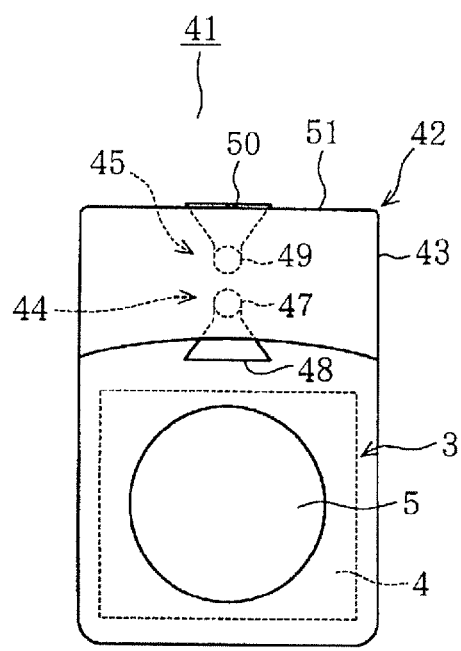
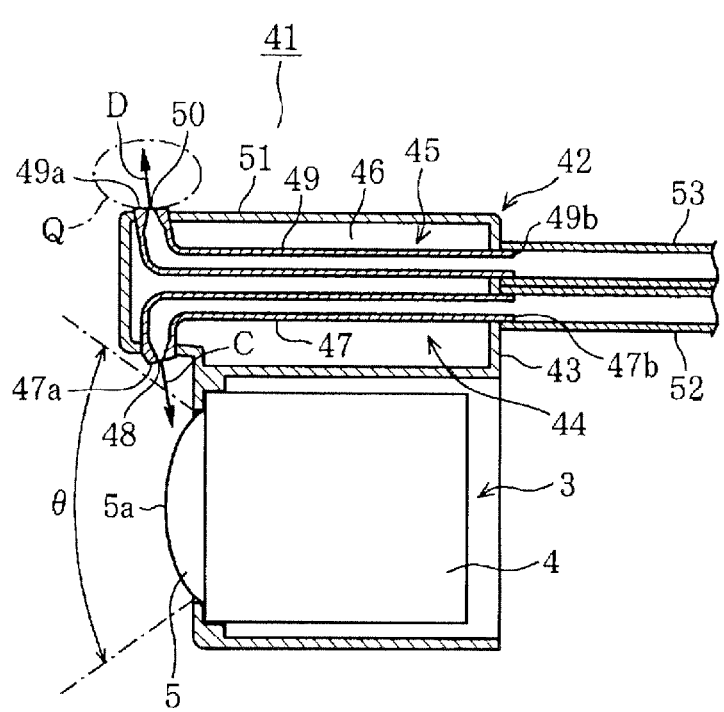

FIG. 15A
FIG. 15B
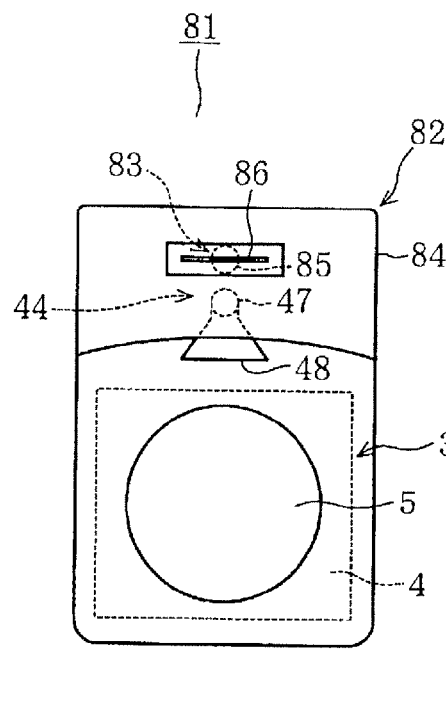
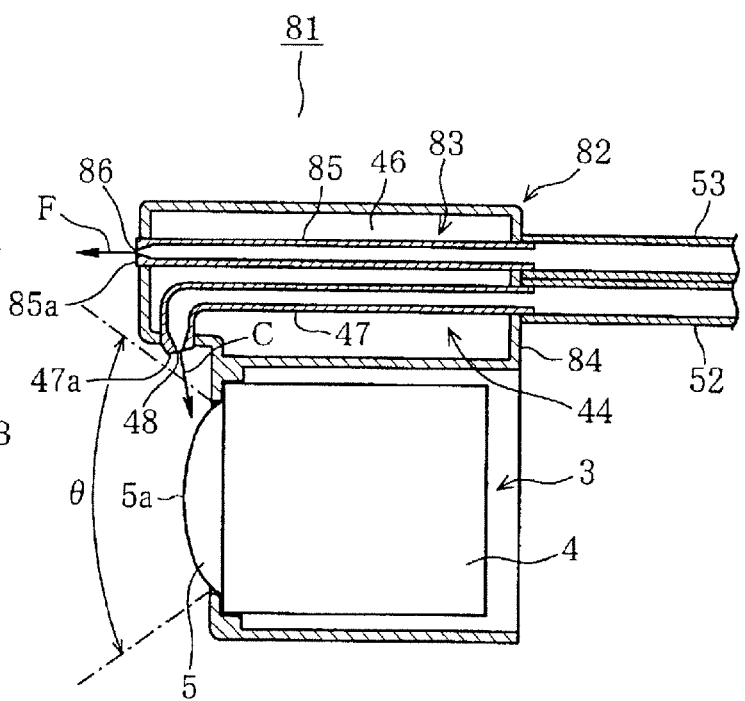

FIG. 16A
FIG. 16B
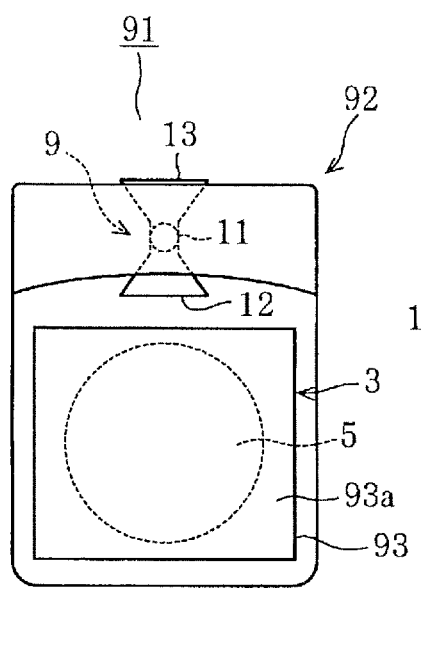
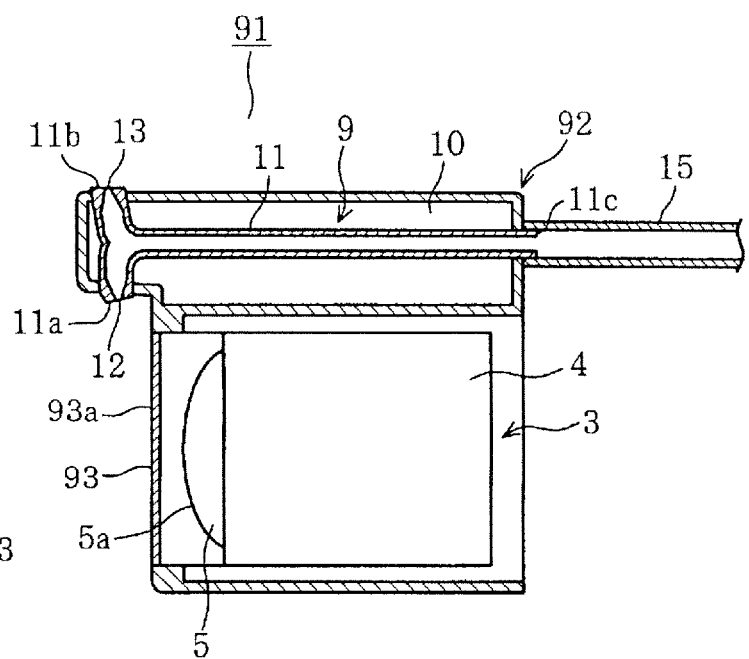

FIG. 24A
FIG. 24B
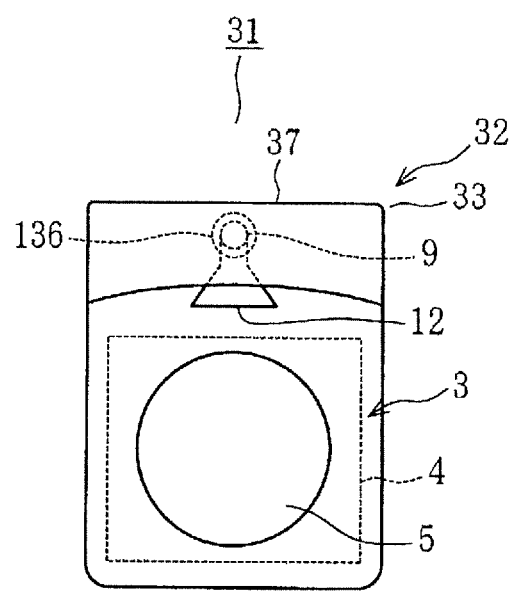
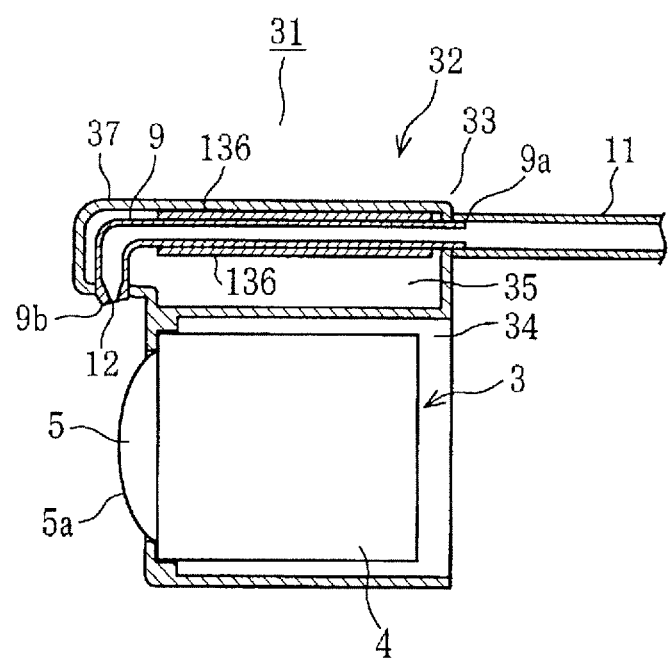

FIG. 26A
FIG. 26B
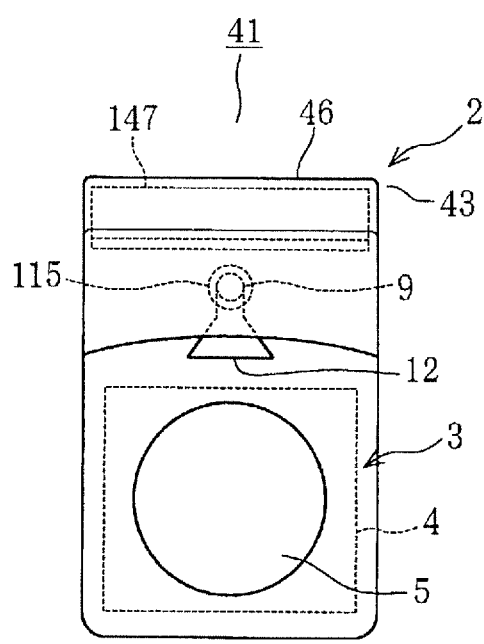
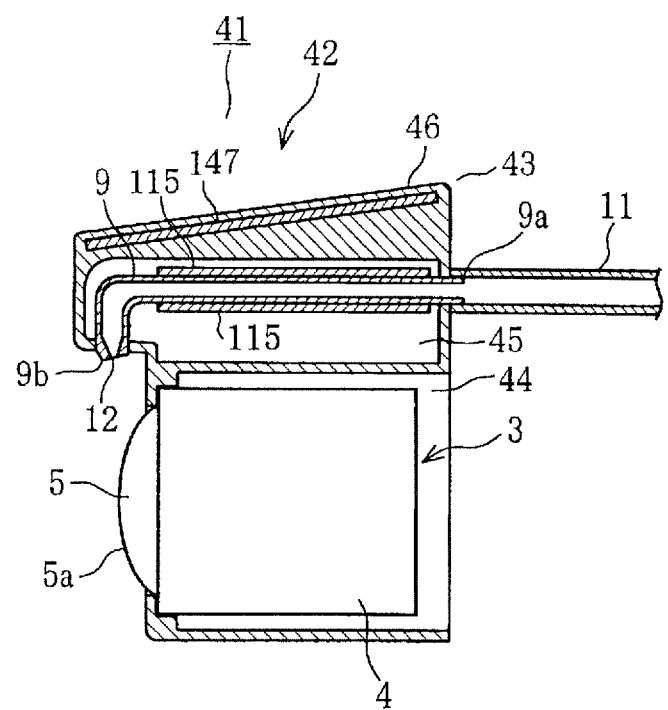

FIG. 28A
FIG. 28B
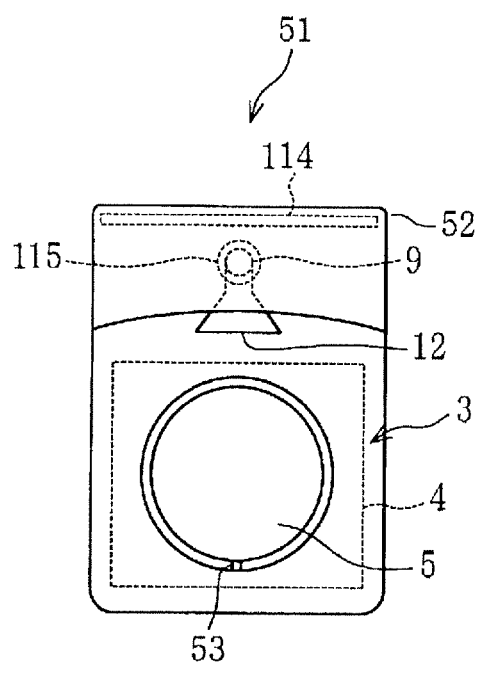
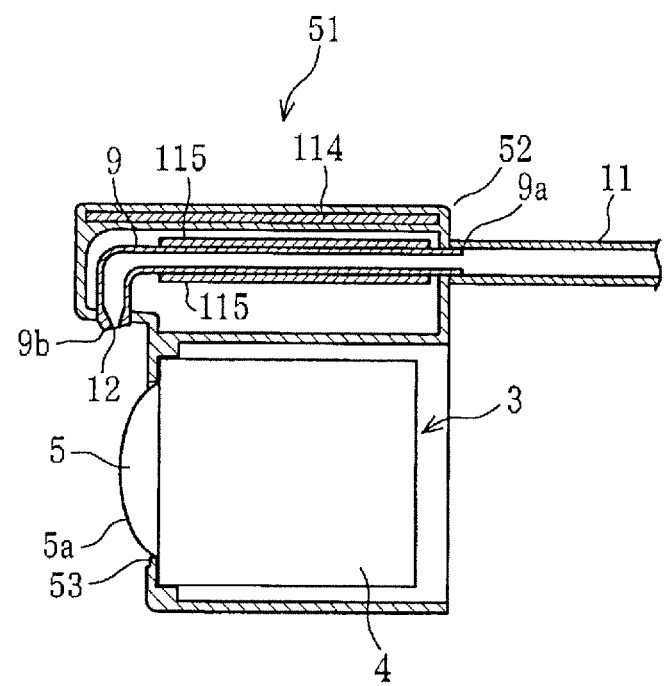

FIG. 29A
FIG. 29B
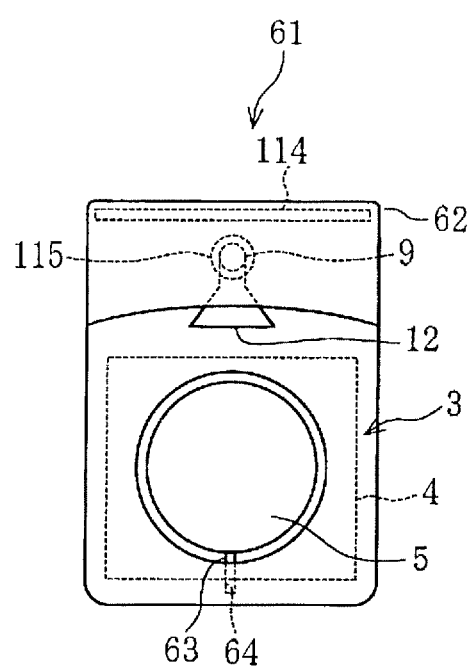
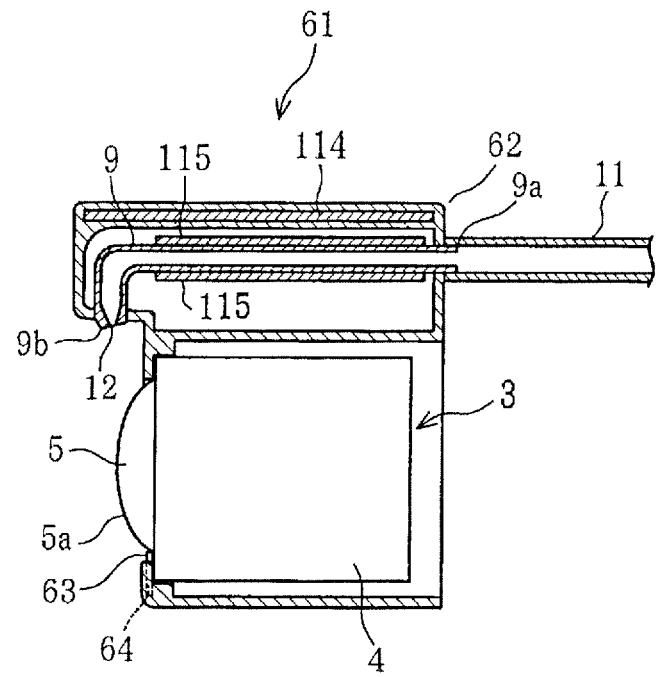

FIG. 31A
FIG. 31B
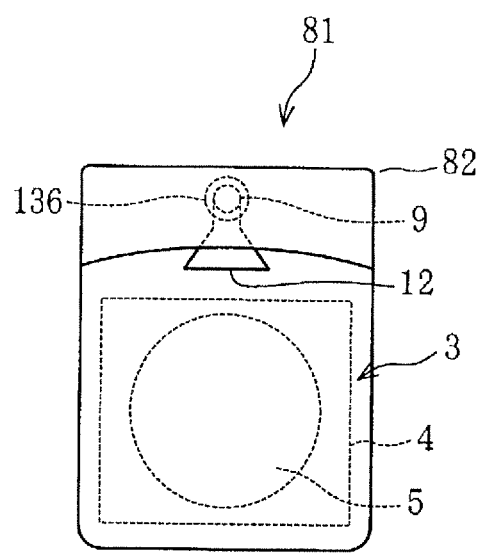
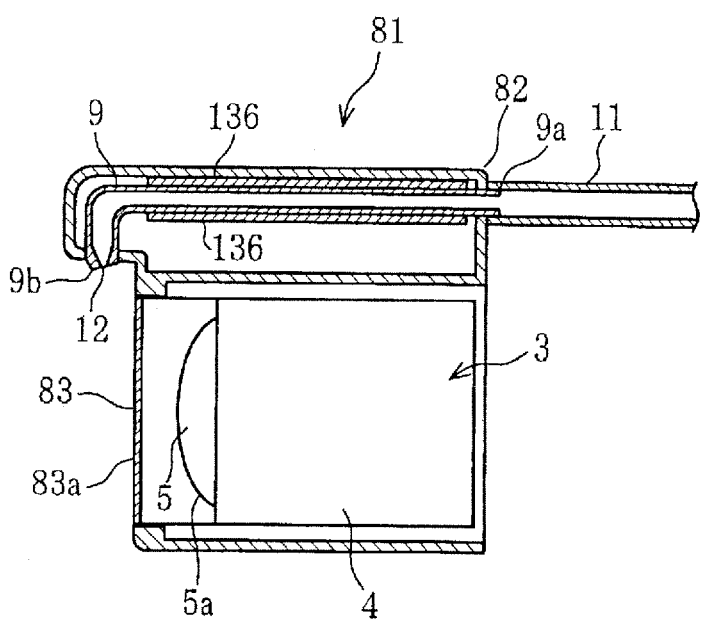

FIG. 32A
FIG. 32B
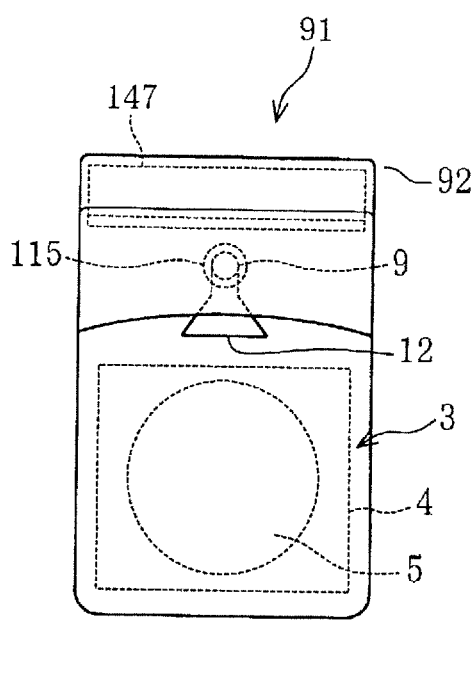
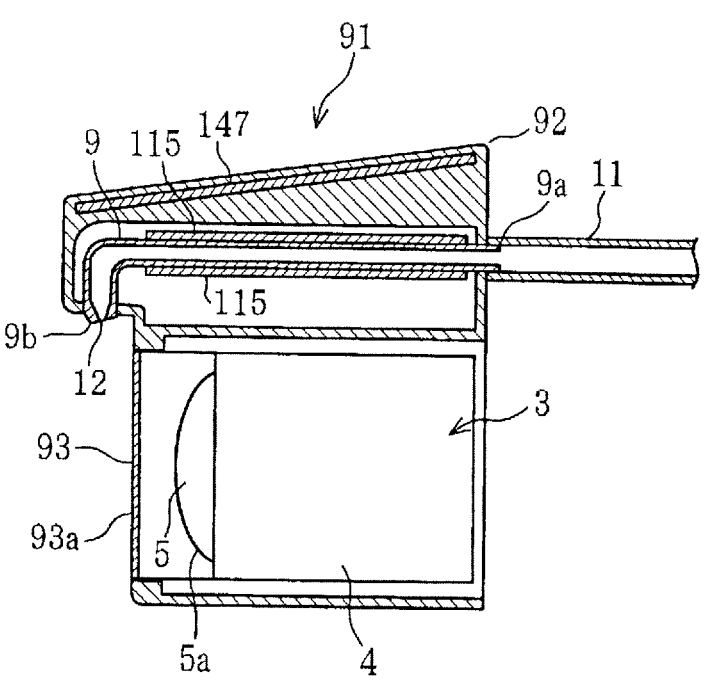

COVER OF VEHICLE OPTICAL SENSOR AND VEHICLE OPTICAL SENSOR DEVICE

CROSS REFERENCE TO RELATED APPLICATION

The present application is based on and claims the benefit of priority of Japanese Patent Applications No. 2010-103461, filed on Apr. 28, 2010, and No. 2010-174448, filed on Aug. 3, 2010, the disclosure of which are incorporated herein by reference.

FIELD OF THE INVENTION

The present invention relates to a cover of a vehicle optical sensor which is disposed in a vehicle as a cover of a vehicle optical sensor, and relates to a vehicle optical sensor device having the cover and the optical sensor.

BACKGROUND INFORMATION

In recent years, vehicles are equipped with optical sensors such as a camera, a laser or the like, and water drops and/or dirt on the lenses of those sensors are removed by jetting a fluid toward the lenses of those sensors. Such a configuration is disclosed in, for example, a patent document in the following.
(PATENT DOCUMENT 1) Japanese Patent Laid-Open No. 2001-171491

For this type of optical sensors disposed on the vehicle, it is assumed that snow and/or ice is accumulated thereon when the vehicle is used in cold/snowy countries, and, thus it is assumed that the sights of those sensors are obstructed by the accumulated snow or ice that hangs down from the above of those sensors in an eaves shape, to get in front of the lens of the optical sensor or to attach on the lens surface.

SUMMARY OF THE INVENTION

In view of the above and other problems, the present invention provides a cover for a vehicle optical sensor and a vehicle optical sensor device that removes foreign matter of the lens or the lens cover glass and that prevents snow or ice to obstruct the sight of the optical sensor even when the vehicle is used in snowy countries.

In an aspect of the present invention, a vehicle optical sensor cover includes: a case having a sensor body cover and a sensor top cover, the sensor body cover housing an optical sensor that has a lens and the sensor top cover covering a top of the optical sensor that is housed in the sensor body cover; and a fluid jet unit having a snow/ice removal orifice, the snow/ice removal orifice jetting a fluid toward an upper space of the lens of the optical sensor or toward an upper space of a lens cover glass if the lens is covered.

In this manner, the snow and ice hanging from the above of the lens or the lens cover glass is appropriately removed by the jetted fluid from the snow/ice removal orifice toward the upper space of the lens or the lens cover glass.

Further, in the vehicle optical sensor cover, the fluid jet unit has an optical sensor cleansing orifice, and the fluid jetted from the optical sensor cleansing orifice is directed toward the lens of the optical sensor or toward the lens cover glass that opposes the lens.

In this manner, the foreign matter attached on the surface of the lens, or on the surface of the lens cover glass is removed by the jetted fluid from the optical sensor cleansing orifice. As a result, the snow or the ice is removed from the front of the lens/lens cover glass, or from the surface of the lens/lens cover glass, thereby preventing the obstruction of the sight of the optical sensor, due to the foreign matter such as snow and/or ice.

According to the vehicle optical sensor cover, the snow/ice removal orifice jets the fluid toward an area that is (a) in the upper space of the lens or the lens cover glass and (b) outside of an imaging angle of the optical sensor. In this manner, the snow or the ice hanging from outside of the imaging angle of the optical sensor to get in the imaging angle can be securely removed, for reserving the sight of the optical sensor.

According to the vehicle optical sensor cover, the snow/ice removal orifice jets the fluid toward an area that is (a) in the upper space of the lens or the lens cover glass and (b) in an upper space of the sensor top cover. In this manner, the snow or the ice hanging from the above toward the front of the lens or the lens cover glass in an eaves shape is removed, and the snow or the ice accumulated on the sensor top cover of the case is also removed.

According to the vehicle optical sensor cover, the fluid jet unit has one fluid passage commonly used for the fluid jetted from the optical sensor cleansing orifice and for the fluid jetted from the snow/ice removal orifice. In this manner, the same fluid is used to remove the snow or the ice on the lens/lens cover glass and to remove the snow or the ice hanging from the above of the lens/lens cover glass. In other words, the configuration of the vehicle optical cover is simplified.

According to the vehicle optical sensor cover, the fluid jet unit includes a jet pressure adjustment unit for adjusting a pressure of the fluid jetted from the optical sensor cleansing orifice and a pressure of the fluid jetted from the snow/ice removal orifice. In this manner, the pressure of the fluid jetted from the orifice is adjusted for appropriately removing the snow or the ice on the lens or the lens cover glass. Further, the snow or the ice hanging from the above toward the front of the lens or the lens cover glass in an eaves shape is appropriately removed.

According to the vehicle optical sensor cover, the fluid jet unit has one fluid passage for the fluid jetted from the optical sensor cleansing orifice and another fluid passage separately for the fluid jetted from the snow/ice removal orifice. In this manner, the different fluid is used respectively for the removal of the snow or the ice on the lens surface of the lens or the glass surface of the lens cover glass and for the removal of the snow or the ice on the hanging snow or the ice. In other words, the fluid may be freely selected for the removal of the snow or the ice, depending on the environment or the ease of implementation. Further, the fluid may be independently jetted from the optical sensor cleansing orifice and from the snow/ice removal orifice.

According to the vehicle optical sensor device, the device includes the vehicle optical sensor cover of claim 2 and a control unit for controlling: (a) an optical sensor cleansing operation for jetting the fluid from the optical sensor cleansing orifice of the fluid jet unit toward a lens surface of the lens or a glass surface of the lens cover glass; and (b) a snow/ice removal operation for jetting the fluid from the snow/ice removal orifice of the fluid jet unit toward at least one of the upper space of the lens and the upper space of the lens cover glass.

In this manner, by jetting the fluid from the optical sensor cleansing orifice toward the lens of the optical sensor or the lens cover glass of the lens, the foreign matter attached on of the lens or the lens cover glass is appropriately removed. Further, by jetting the fluid from the snow/ice removal orifice toward at least one of the upper space of the lens and the upper space of the lens cover glass, the snow or the ice hanging from the above toward the front of the lens or the lens cover glass in an eaves shape is appropriately removed.

According to the vehicle optical sensor device, the control unit controls the fluid jet unit for separately performing the optical sensor cleansing operation and the snow/ice removal operation. In this manner, the fluid is jetted toward the lens or the lens cover glass at one timing, and is jetted toward the upper space of the lens or the lens cover glass at a different timing, which may be determined freely, depending on the environment, for example.

According to the vehicle optical sensor device, the device includes at least one of: a start operation detection unit for detecting a start operation for starting the snow/ice removal operation by a user; a vehicle start-up detection unit for detecting a start-up of a vehicle; a temperature detection unit for detecting temperature of ambient air or the optical sensor; and an obstacle detection unit for detecting ice or snow on the sensor top cover which obstacles a sight of the optical sensor based on an analysis of an image taken by the optical sensor, and the control unit starts the snow/ice removal operation by the fluid jet unit when at least one of the start operation of the snow/ice removal operation, the start-up of the vehicle, the temperature of the ambient air or the optical sensor being lower than a preset value, or the ice or snow existing as an obstacle in the sight of the optical sensor is detected.

In this manner, the fluid is jetted from the snow/ice removal orifice when at least one of the above conditions of (a) the user operation for starting the snow/ice removal operation, (b) a start-up of the vehicle, (c) the temperature below a threshold, or (d) the obstruction of the sight of the optical sensor by the snow or the ice is detected.

According to the vehicle optical sensor device, the device includes at least one of: an end operation detection unit for detecting an end operation for ending the snow/ice removal operation by a user; a vehicle start-up completion detector for detecting completion of a start-up of the vehicle; a timer for detecting a lapse of preset time from a start of the snow/ice removal operation, and the control unit ends the snow/ice removal by the fluid jet unit when at least one of the end operation of the snow/ice removal operation, the completion of the start-up of the vehicle, the temperature of the ambient air or the optical sensor being higher than a preset value, disappearance of the ice or the snow once detected by the obstacle detection unit, or the lapse of the preset time from a start of the snow/ice removal operation is detected.

In this manner, the jetting of the fluid from the snow/ice removal orifice ends when at least one of the above conditions of (a) the user operation of ending the snow/ice removal operation, (b) completion of the start-up of the vehicle, (c) the temperature equal to or above a threshold, (d) disappearance of the obstruction of the sight of the optical sensor by the snow or the ice, or (e) the lapse of the preset time from a start of the snow/ice removal operation is detected.

According to the vehicle optical sensor device, the control unit starts the optical sensor cleansing operation after starting the snow/ice removal operation. In this manner, even when the snow/ice removal operation causes the snow or the ice to melt and causes water drops from melting snow/ice to attach on the lens or the lens cover glass, the water drops on the lens or the lens cover glass is appropriately removed.

In another aspect of the present invention, a vehicle optical sensor cover for use in a vehicle includes: a sensor case constituted by a body for casing an optical sensor having a lens and a top that covers an upper space of the optical sensor in a cased condition; and a top heater for heating the top of the sensor case. Because the top heater for heating the top of the sensor case with the optical sensor housed therein is provided, heat from the top heater prevents accumulation of snow or ice on the top, or heat melts the accumulated snow, thereby preventing the lens or the lens cover glass from being covered by the snow or ice, and preventing obstruction of the sight of the optical sensor, when the optical sensor is used in a snowy country.

According to the vehicle optical sensor cover, it further includes: a cleansing nozzle in the sensor case for jetting a cleansing fluid that is supplied from a cleansing fluid tank, and the cleansing fluid is jetted toward the lens of the optical sensor, or toward a lens cover glass that opposes the lens as a lens cover when the lens cover glass is provided. Because the cleansing nozzle in the sensor case for jetting a cleansing fluid is provided, the foreign matter attached on the surface of the lens, or on the surface of the lens cover glass is removed by the jetted fluid from the cleansing nozzle.

According to the vehicle optical sensor cover, the top of the sensor case having the optical sensor cased therein and being installed in a vehicle is formed in a shape that has a slant portion or a curved portion slanting from a level. In this manner, the snow on the top of the sensor case is either difficult to accumulate/stay on the top, or easy to be removed from the top when the snow melts.

According to the vehicle optical sensor cover, the cleansing nozzle is disposed close to the top of the sensor case, and the top heater heats both of the top and the cleansing nozzle. In this manner, in addition to preventing the accumulation of the snow on the top or melting the accumulated snow on the top, by jetting heated fluid, which is provided from the cleansing fluid tank to be supplied to the cleansing nozzle, toward the lens or the lens cover glass, the snow or the ice attached on the lens or the lens cover glass is removed or the lens/lens cover glass is prevented from being dimmed.

According to the vehicle optical sensor cover, a nozzle heater for heating the cleansing nozzle provided separately from the top heater, that is, in addition to the top heater. In this case, too, the heated fluid, heated in a course of supply from the tank to the nozzle, is jetted toward the lens or the lens cover glass, thereby melting and removing the snow or the ice from the lens or the lens cover glass, or preventing the lens or the lens cover glass from dimming.

According to the vehicle optical sensor device, the device includes: the vehicle optical sensor cover of claim 14; a controller for controlling a cleansing operation by the cleansing nozzle of claim 15 and a heating operation by the top heater of claim 14; and a sensor lens of the optical sensor. In this manner, the vehicle optical sensor device removes the foreign matter on the lens or the lens cover glass by the cleansing operation by the cleansing nozzle. Further, even when the device is used in snowy countries, the top heater dissipating heat prevents the accumulation of the snow on the top or melts the accumulated snow on the top.

According to the vehicle optical sensor device, the device further includes: a vehicle start-up detection unit for detecting a start-up of the vehicle, and the controller starts a heating operation by the top heater when the start-up of the vehicle is detected by the vehicle start-up detection unit. In this manner, when the user starts to operate the vehicle by, for example, turning on an accessory switch or an ignition switch of the vehicle, the accumulation of the snow on the top is prevented, or the accumulated snow on the top is melted.

According to the vehicle optical sensor device, the device further includes: a vehicle start-up completion detection unit for detecting completion of the start-up of the vehicle, and the controller continues the heating operation by the top heater after starting the heating operation in response to the detection of the start-up of the vehicle by the vehicle start-up detection unit, until the completion of the start-up of the vehicle detected by the vehicle start-up completion detection unit. In this manner, until the user is going to end the operation of the vehicle by, for example, turning off the accessory switch or the ignition switch of the vehicle, the accumulation of the snow on the top is prevented, or the accumulated snow on the top is melted.

According to the vehicle optical sensor device, the device includes: a timer for detecting a lapse of preset time from a start of the heating operation by the top heater, and the controller continues the heating operation by the top heater after starting the heating operation in response to the detection of the start-up of the vehicle by the vehicle start-up detection unit, until the lapse of the preset time from the start of the heating operation is detected by the timer. In this manner, until the lapse of the preset time after turning on the accessory switch or the ignition switch of the vehicle by the user, for example, the accumulation of the snow on the top is prevented, or the accumulated snow on the top is melted.

According to the vehicle optical sensor device, the device includes: a temperature detection unit for detecting temperature of ambient air or the optical sensor, and the controller starts the heating operation by the top heater when the temperature detected by the temperature detection unit is lower than a preset value. In this manner, when the detected temperature is lower than the preset value, the accumulation of the snow on the top is prevented, or the accumulated snow on the top is melted.

According to the vehicle optical sensor device, the controller continues the heating operation by the top heater after starting the heating operation in response to the temperature detected by the temperature detection unit to be lower than the preset value, until the temperature detected by the temperature detection unit is equal to or higher than the preset value. In this manner, until the detected temperature becomes higher than the preset value, the accumulation of the snow on the top is prevented, or the accumulated snow on the top is melted.

According to the vehicle optical sensor device, the device includes: a timer for detecting a lapse of preset time from a start of the heating operation by the top heater, and the controller continues the heating operation by the top heater after starting the heating operation in response to the temperature detected by the temperature detection unit to be lower than the preset value, until the lapse of the preset time from the start of the heating operation is detected by the timer. In this manner, the heating operation is continued until the lapse of the preset time from the fall of the temperature below the preset value, for preventing the accumulation of the snow on the top, or for melting the accumulated snow on the top.

According to the vehicle optical sensor device, the device includes: an image analyzer for analyzing an image that is taken by the optical sensor; and an accumulation detection unit for detecting an accumulation of snow or ice on the top of the sensor case based on a result of the analysis of the image by the image analyzer, and the controller starts the heating operation by the top heater when the accumulation of snow or ice on the top of the sensor case is detected by the accumulation detection unit. In this manner, when the accumulation of the snow is detected, the accumulated snow on the top is melted and the accumulation of the snow on the top is prevented thereafter.

According to the vehicle optical sensor device, the controller continues the heating operation by the top heater after detecting the accumulation of snow or ice on the top of the sensor case by the accumulation detection unit, until the accumulation of snow and ice is not detected by the accumulation detection unit. In this manner, when the accumulation of the snow on the top is detected, the accumulated snow on the top is melted until the snow on the top is not detected, and the accumulation of the snow on the top is prevented thereafter.

According to the vehicle optical sensor device, the device includes: a timer for detecting a lapse of preset time from a start of the heating operation by the top heater, and the controller continues the heating operation by the top heater after starting the heating operation in response to the accumulation of snow or ice detected by the accumulation detection unit, until the lapse of the preset time from the start of the heating operation of the top heater is detected by the timer. In this manner, the accumulated snow on the top is melted after the accumulation of the snow on the top is detected until the lapse of the preset time, and the accumulation of the snow on the top is prevented thereafter.

According to the vehicle optical sensor device, the controller starts the cleansing operation by the cleansing nozzle after starting the heating operation by the top heater. In this manner, even when the heating operation melts the snow or the ice and water drops from melted snow or melted ice attach on the lens or the lens cover glass, those water drops are removed from the lens or the lens cover glass.

BRIEF DESCRIPTION OF THE DRAWINGS

Objects, features, and advantages of the present disclosure will become more apparent from the following detailed description made with reference to the accompanying drawings, in which:

FIGS. 1A/1B show illustrations of (a) a front face and (b) a cross section of a side face of an optical sensor device in a first embodiment of the present invention;

FIGS. 9A/9B show illustrations of (a) a front face and (b) a cross section of a side face of an optical sensor device in a third embodiment of the present invention;

FIGS. 15A/15B show illustrations of (a) a front face and (b) a cross section of a side face of an optical sensor device in modification of the first to third embodiments of the present invention, corresponding to FIGS. 13A/13B;

FIGS. 16A/16B show illustrations of (a) a front face and (b) a cross section of a side face of an optical sensor device in modification of the first to third embodiments of the present invention, corresponding to FIGS. 13A/13B;

FIGS. 24A/24B show other illustrations of (a) a front face and (b) a cross section of a side face of an optical sensor device in a fifth embodiment of the present invention;

FIGS. 26A/26B show yet other illustrations of (a) a front face and (b) a cross section of a side face of an optical sensor device in a sixth embodiment of the present invention;

FIGS. 28A/28B show still yet other illustrations of (a) a front face and (b) a cross section of a side face of an optical sensor device in modification of the fourth to sixth embodiments of the present invention;

FIGS. 29A/29B show still yet other illustrations of (a) a front face and (b) a cross section of a side face of an optical sensor device in modification of the fourth to sixth embodiments of the present invention corresponding to FIGS. 28A/28B;

FIGS. 31A/31B show still yet other illustrations of (a) a front face and (b) a cross section of a side face of an optical sensor device in modification of the fourth to sixth embodiments of the present invention corresponding to FIGS. 28A/28B; and FIGS. 32A/32B show still yet other illustrations of (a) a front face and (b) a cross section of a side face of an optical sensor device in modification of the fourth to sixth embodiments of the present invention corresponding to FIGS. 28A/28B.

DETAILED DESCRIPTION

First Embodiment

Figure 2:
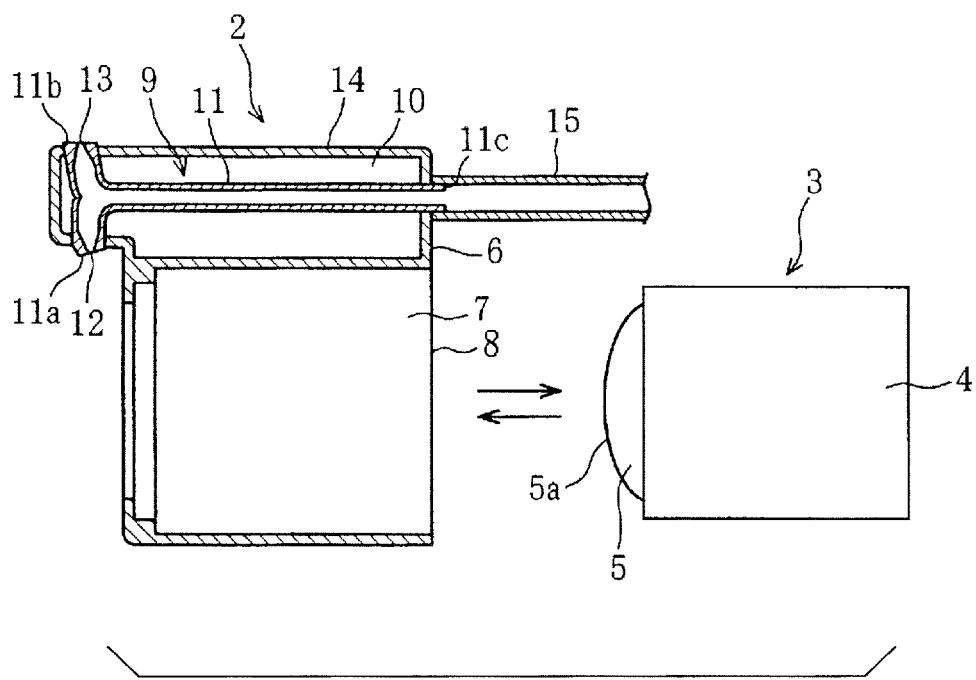
FIG. 2 shows an exploded view of a camera cover and a camera.

The first embodiment of the present invention, in which a camera is used as an optical sensor, is explained with reference to FIGS. 1A to 5. An optical sensor unit 1 (i.e., a vehicle optical sensor device in claims) includes, as shown in FIGS. 1A/1B, a camera cover 2 (i.e., a vehicle optical sensor cover in claims) and a camera 3 (i.e., an optical sensor in claims) detachably installed therein. A front side of a case 4 of the camera 3 has a lens 5 (i.e., FIG. 1A), and a back side of the case 4 (i.e., FIG. 1B) has a power supply line for supplying power to the camera 3 (not illustrated) and an image signal output line for outputting image signals (not illustrated) drawn out therefrom. The lens 5 is a wide angle lens for capturing an image in a wide angle, with a lens surface 5a formed in a curved shape.

An inside of the lower part of a body 6 of the camera cover 2 is a camera housing 7 for housing the camera 3 (i.e., a sensor body cover in claims), and a back side of the lower part of the body 6 has an opening 8. The camera 3 is, as shown in FIG. 2, installed in the camera housing 7 through the opening 8 from an outside of the camera housing 7, or taken out from the camera housing 7 through the opening 8 to the outside.

An inside of the upper part of the body 6 of the camera cover 2 is a nozzle housing 10 for housing a nozzle 9 (i.e., a fluid jet unit in claims). That is, the nozzle 9 is disposed in an upper space of the camera 3. The nozzle 9 includes a passage 11 for passing a cleansing fluid (i.e., a fluid in claims), and the passage 11 branches off to an upward direction and a downward direction at its end. An end 11a of the passage 11 branching off to the downward direction has an optical sensor cleansing orifice 12 disposed in an exposed condition from the body 6, and an end 11b of the passage 11 branching off to the upward direction has a snow/ice removal orifice 13 disposed in an exposed condition from the body 6.

The optical sensor cleansing orifice 12 is disposed in an upper front space of the lens surface 5a of the lens 5 of the camera 3, and has a downward jet direction (i.e., a direction shown as an "A" arrow in FIG. 1B) set toward the lens surface 5a from the upper front space of the lens surface 5a, for jetting the cleansing fluid toward the lens surface 5a. The snow/ice removal orifice 13 is disposed in an upper front space of the lens surface 5a of the lens 5 of the camera 3 and, at the same time, in an upper space of the optical sensor cleansing orifice 12, and has an upward jet direction (i.e., a direction shown as a "B" arrow in FIG. 1B) set toward an area including an upper space of the lens surface 5a and, at the same time, an upper space of a top surface 14 of the body 6 (i.e., an area "P" in FIG. 1B), for jetting the cleansing fluid toward an area including the upper space of the lens surface 5a and the upper space of the top surface 14 of the body 6. In addition, the jet direction of the cleansing fluid from the snow/ice removal orifice 13 is outside of an imaging angle of the camera 3 (i.e., an angle "θ" in FIG. 1B). A base 11c of the passage 11 has a flexible tube 15 connected at a back side of the body 6.

Figure 3:
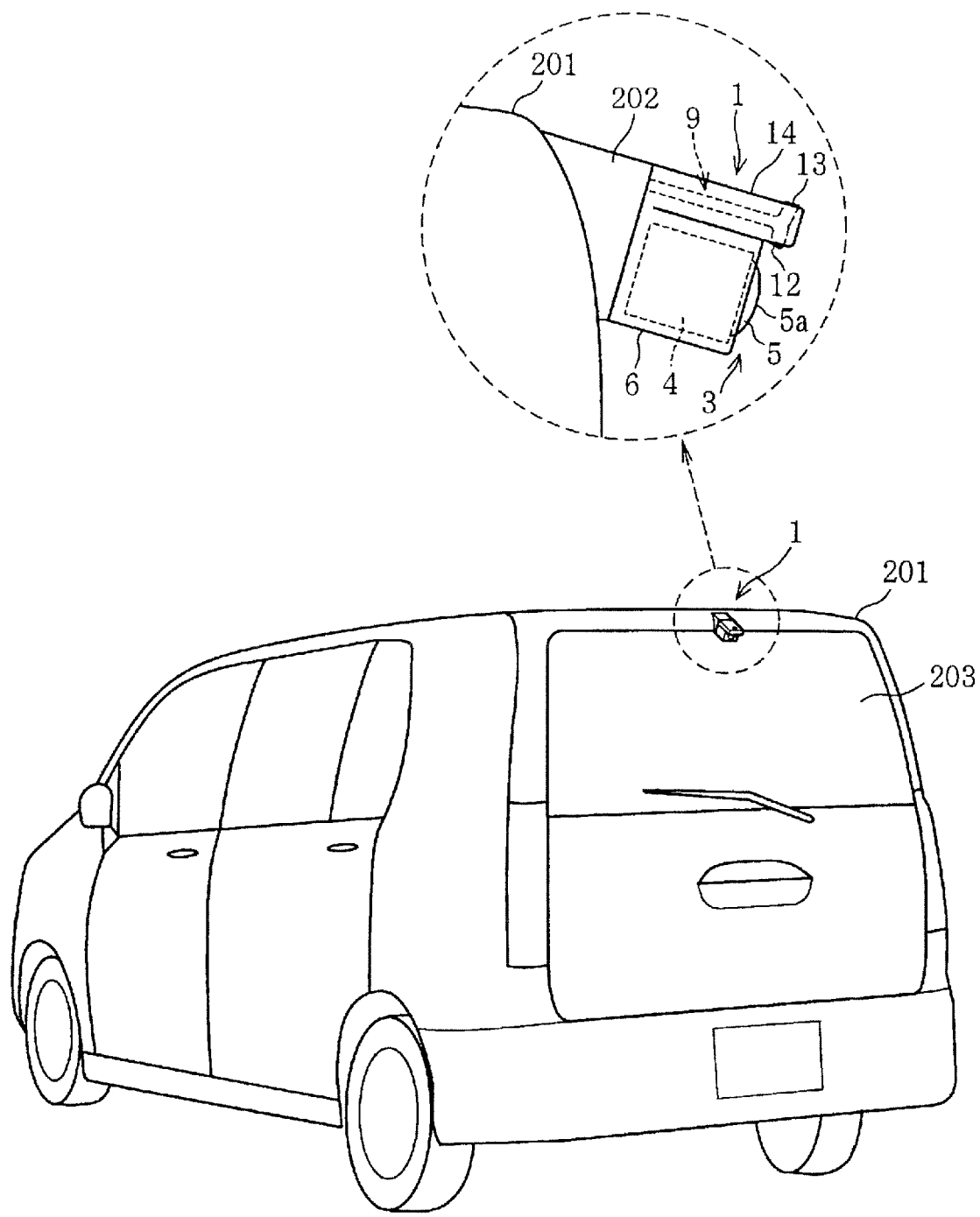
FIG. 3 shows a perspective view of the optical sensor device in a vehicle-installed condition.

The optical sensor unit 1 configured in the above-described manner is installed at an upper end of a rear window 203 of a vehicle body 201 by using a fitting metal 202, as shown in FIG. 3, for example, allowing the camera 3 to have a downward viewing direction relative to a level direction to have a back side view of the vehicle body 201, with the top surface 14 of the body 6 of the camera cover 2 slanting from its back side to its front side. In other words, the camera 3 serves as a back view camera for viewing the back side of the vehicle when the vehicle is backing. Further, the slanting position of the camera 3, with the top surface 14 of the body 6 of the camera cover 2, makes it difficult for snow to be accumulated on the top surface 14, or makes it easy for snow to slide down and be removed from the top surface 14 when snow is accumulated thereon.

Figure 4:
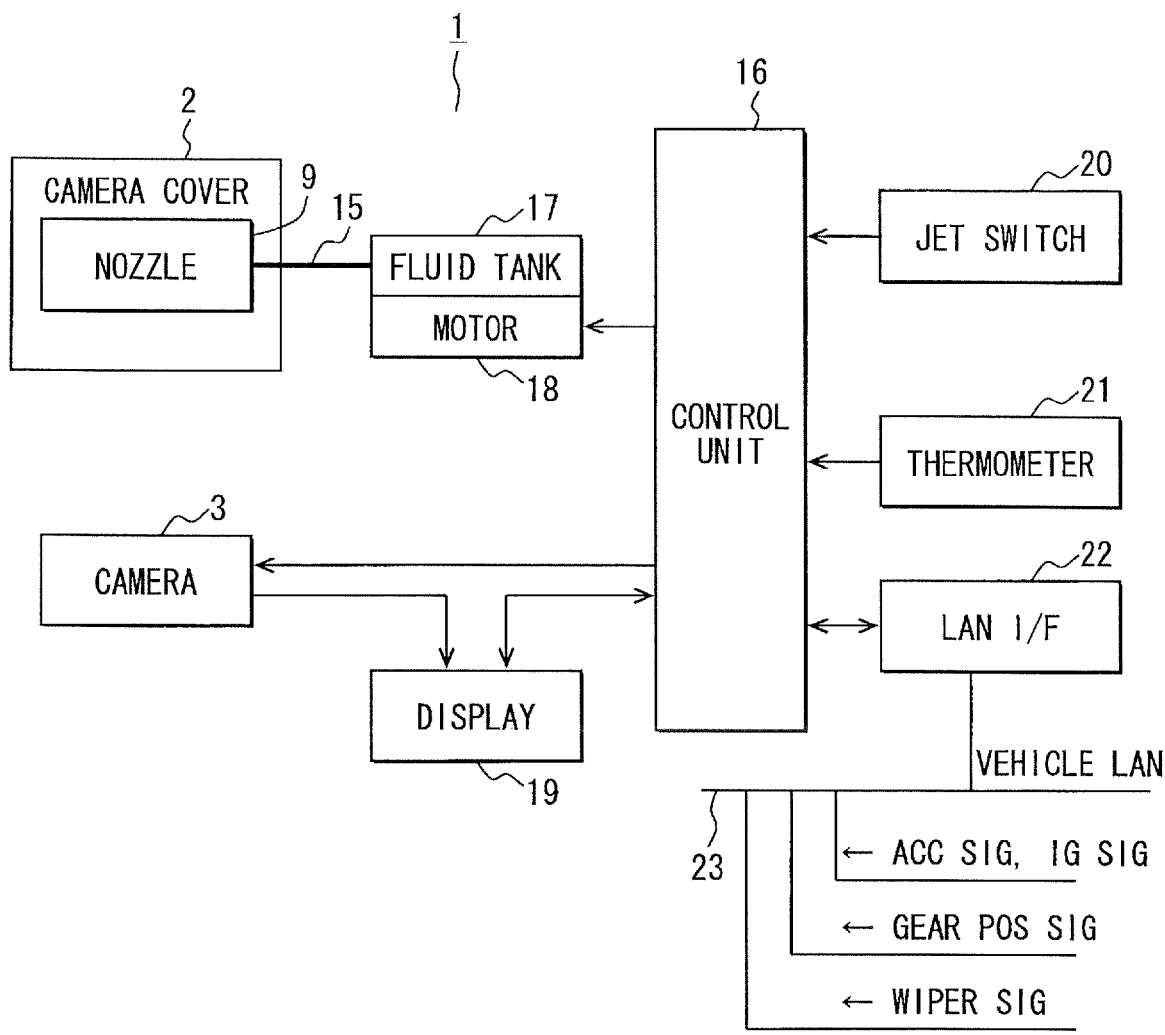
FIG. 4 shows a function block diagram of the optical sensor device.

FIG. 4 shows a function block diagram of electrical configuration of the optical sensor unit 1 and its peripheral circuit. The vehicle optical sensor device in the present invention includes the optical sensor unit 1 and a control unit 16 as indispensable elements. The control unit 16 (i.e., a control unit, a start operation detection unit, a vehicle start-up detection unit, a temperature detection unit, an obstacle detection unit, an end operation detection unit, a vehicle start-up completion detection unit, and a timer in claims) is constituted as a microcomputer with other parts, for controlling an imaging operation of the camera 3 and for controlling an optical sensor cleansing operation and a snow/ice removal operation by jetting the cleansing fluid from the optical sensor cleansing orifice 12 and from the snow/ice removal orifice through operating a motor 18 in a cleansing fluid tank 17, based on execution of a pre-stored control program. In this case, the cleansing fluid tank 17 is disposed in a well-known engine room in the vehicle body 201.

When the motor 18 is driven, the cleansing fluid stored in the cleaning fluid tank 17 is supplied to the nozzle 9 through the tube 15, and the cleaning fluid supplied to the nozzle 9 is jetted at high pressure from the snow/ice removal orifice 13 for an area including the upper space of the lens surface 5a and the upper space of the top surface 14 of the body 6 at the same time as it is jetted at high pressure toward the lens surface 5a of the lens 5 of the camera 3 from the optical sensor cleansing orifice 12 by the water pressure. In this case, "jetting of the fluid" means providing the cleansing fluid in a mist form, providing the cleansing fluid in a larger granular form in comparison to the mist form for a suitable amount, or providing the cleansing fluid in a gushing manner in a lump of fluid for a fixed amount, for conceptually including all forms of jetting to achieve the intended effect of the present invention. The fluid may be jetted in a linear manner, or in a spreading manner in a wide angle.

A liquid crystal display device 19 is disposed in a vehicle compartment, for displaying an image that corresponds to an inputted video signal from the camera 3, after decoding the inputted video signal. The control unit 16 analyzes the image displayed on the liquid crystal display device 19, and determines whether snow or ice is included in the image, and determines whether the sight of the camera 3 is obstructed by snow or ice.

A jet switch 20 is a switch which is operable by a user, and outputs an operation detection signal to the control unit 16 upon having a user operation. Upon having an input of the operation detection signal from the jet switch 20, the control unit 16 drives the motor 18 by outputting a drive instruction signal to the motor 18. In this case, the jet switch 20 may be a mechanical switch, or may be a touch switch to be provided as a screen image on the liquid crystal display device 19.

A device thermometer 21 measures temperature of the body 6 of the camera cover 2 (i.e., temperature of the optical sensor unit 1), and the measured temperature is output as a temperature signal to the control unit 16. The control unit 16 having an input of the temperature signal from the device thermometer 21 then analyzes the temperature signal to detect temperature of the body 6 of the camera cover 2. In addition, the control unit 16 has a timer function to measure timing.

A vehicle LAN interface unit 22, having inputs of an ACC signal showing ON/OFF of an accessories (ACC) switch, an IG signal showing ON/OFF of an ignition (IG) switch, a gear position signal showing the position of a gear, a wiper operation signal showing an operation condition of a wiper and the like from various sensors and ECUs installed in the vehicle through a vehicle LAN 23, outputs the input signals to the control unit 16. When the control unit 16 has various signals from the vehicle LAN interface unit 22, the control unit 16 analyzes the signals to detect ON/OFF of the ACC switch, ON/OFF of the IG switch, the position of the gear, the operation condition of the wiper and the like.

Figure 5:
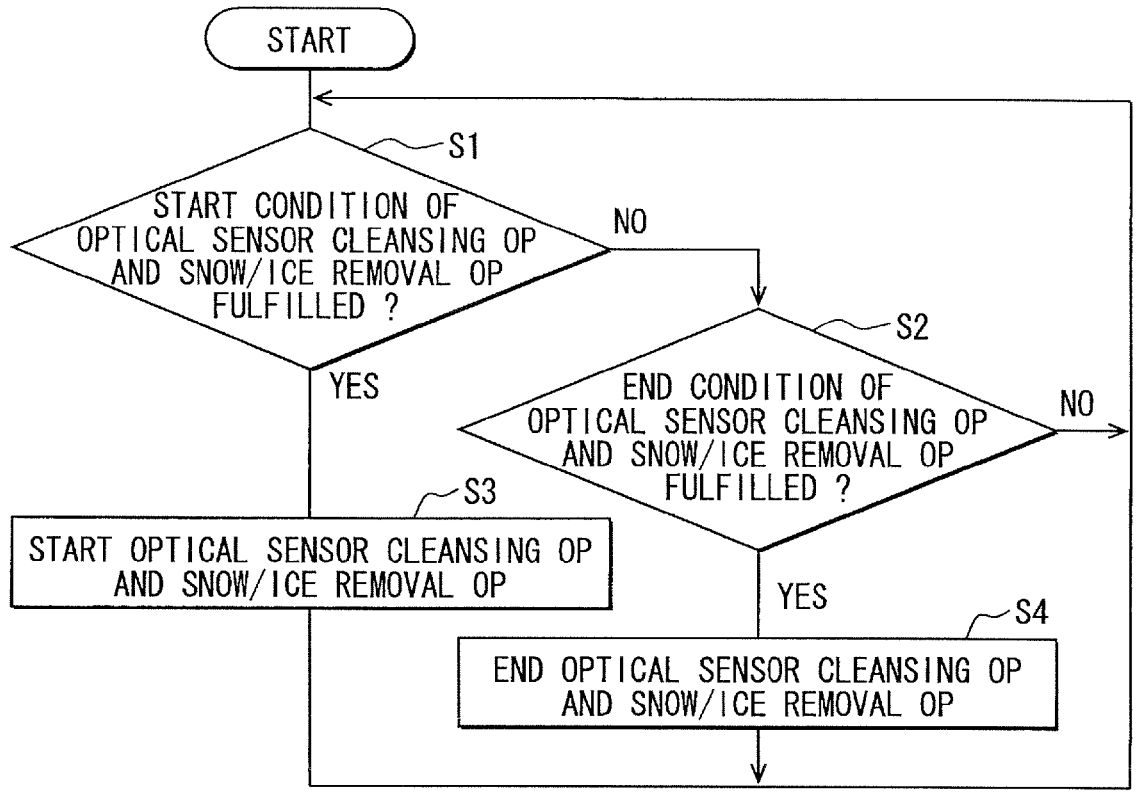
FIG. 5 shows a flow chart of a process in the optical sensor device.

The operation of the above configuration is explained referring to FIG. 5.

The control unit 16 determines whether a start condition of the optical sensor cleansing operation and the snow/ice removal operation is fulfilled (step S1), and determines an end condition of the optical sensor cleansing operation and the snow/ice removal operation is fulfilled, when it is in a power-on condition (i.e., when the optical sensor unit 1 is in a working condition) (step S2).

When the control unit 16 determines that the start condition of the optical sensor cleansing operation and the snow/ice removal operation is fulfilled, based on fulfillment of at least one of several conditions of, an input of the operation detection signal from the jet switch 20 according to the user operation thereof, turning-on of the ACC switch or the IG switch according to an input signal from the vehicle LAN interface unit 22, temperature of the body 6 of the camera cover 2 being lower than a preset temperature according to the temperature signal from the device thermometer 21, or having obstruction in the sight of the camera 3 according to the image displayed on the liquid crystal display device 19 (step S1, YES), the control unit 16 outputs the drive instruction signal to the motor 18, to start the optical sensor cleansing operation and the snow/ice removal operation (step S3).

In this case, the cleaning fluid stored in the cleaning fluid tank 17 is jetted at high pressure from the snow/ice removal orifice 13 toward an area including the upper space of the lens surface 5a and the upper space of the top surface 14 of the body 6, at the same time as it is jetted at high pressure toward the lens surface 5a of the lens 5 of the camera 3 from the optical sensor cleansing orifice 12. In this manner, by jetting of the cleansing fluid from the optical sensor cleansing orifice 12, foreign matter attached on the lens surface 5a of the lens 5 of the camera 3 is removed, and, by jetting of the cleaning fluid from the snow/ice removal orifice 13, snow or ice protruding in an eaves shape into the front upper space of the lens surface 5a of the lens 5 of the camera 3 from the top surface 14 of the body 6 of the camera cover 2 is removed.

Thereafter, when the control unit 16 determines that the end condition of the optical sensor cleansing operation and the snow/ice removal operation is fulfilled, based on fulfillment of at least one of several conditions of, an input of the operation detection signal from the jet switch 20 according to the user operation thereof, turning-off of the ACC switch or the IG switch according to an input signal from the vehicle LAN interface unit 22, temperature of the body 6 of the camera cover 2 being equal to or higher than the preset temperature according to the temperature signal from the device thermometer 21, having no obstruction in the sight of the camera 3 according to the image displayed on the liquid crystal display device 19, or a lapse of a preset time from a start of the sensor cleansing operation and the snow/ice removal operation, after starting of the sensor cleansing operation and the snow/ice removal operation (step S2, YES), the control unit 16 stops to output the drive instruction signal to the motor 18 to stop the motor 18, for stopping the optical sensor cleansing operation or the snow/ice removal operation (step S4).

In this case, the conditions may be arbitrarily combined to start and end the optical sensor cleansing operation and the snow/ice removal operation. That is, for example, the optical sensor cleansing operation and the snow/ice removal operation may be started in response to turning-on of the ACC switch or the IG switch, and the optical sensor cleansing operation and the snow/ice removal operation may be ended in response to the user operation of the jet switch 20.

In the first embodiment described above, because the optical sensor cleansing orifice 12 jetting the cleaning fluid toward the lens surface 5a of the lens 5 of the camera 3 and the snow/ice removal orifice 13 jetting the cleaning fluid toward an area including the upper space of the lens surface 5a are provided in the camera cover 2 which has the camera 3 detachably installed therein, foreign matter on the lens surface 5a of the lens 5 of the camera 3 is removed adequately by jetting the cleaning fluid from the optical sensor cleansing orifice 12, and snow or ice protruding in an eaves shape into the front upper space of the lens surface 5a of the lens 5 of the camera 3 from the top surface 14 of the body 6 of the camera cover 2 is removed adequately by jetting the cleaning fluid from the snow/ice removal orifice 13.

In addition, because the cleaning fluid is configured to be jetted toward an area out of the imaging angle of the camera 3, snow or ice outside of the imaging angle of the camera 3 is removed, thereby securely removing snow or ice hanging into the imaging angle from outside of the imaging angle. In addition, because the cleaning fluid is configured to be jetted toward an area including the upper space of the top surface 14 of the body 6, snow or ice protruding in an eaves shape of eaves into the front upper space of the lens surface 5a of the lens 5 of the camera 3 as well as snow or ice accumulated on the top surface 14 of the body 6 of the camera cover 2 are adequately removed.

In addition, the passage 11 for passing the cleansing fluid that is jetted toward the lens surface 5a of the lens 5 of the camera 3 and the passage 11 for passing the cleansing fluid that is jetted toward an area including the upper space of the lens surface 5a are disposed as a single passage, the same fluid may be used as the fluid for removing foreign matter on the lens surface 5a and as the fluid for removing snow or ice protruding in an eaves shape into the front upper space of the lens surface 5a from the top surface 14 of the body 6, for simplified configuration of the optical sensor unit 1 using a single fluid type.

Second Embodiment

The second embodiment of the present invention is explained referring to FIGS. 6A to 8 in the following. The explanation is focused to differences of the present embodiment from the first embodiment, for the brevity of explanation. In the present embodiment, one of the optical sensor cleansing operation and the snow/ice removal operation is alternatively performed, in comparison to the simultaneous performing of two operations in the first embodiment.

Figure 6A:
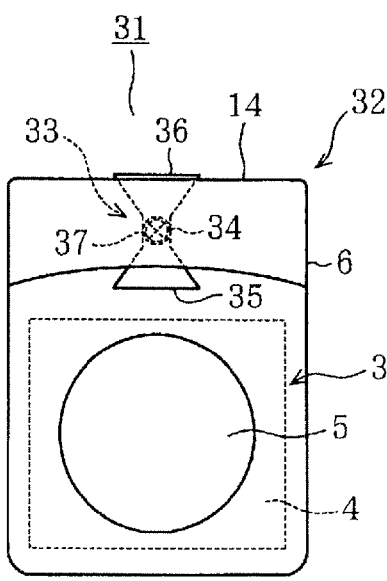
FIGS. 6A/6B show illustrations of (a) a front face and (b) a cross section of a side face of an optical sensor device in a second embodiment of the present invention.
Figure 6B:
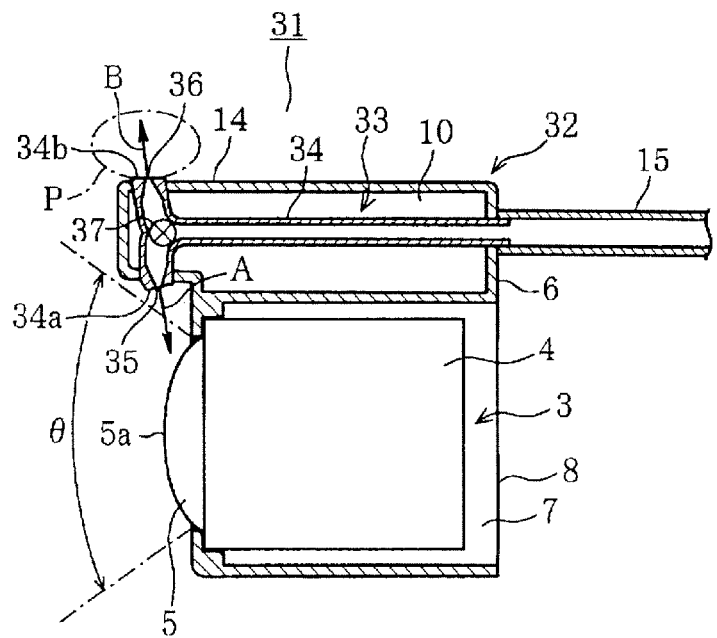
Figure 7:
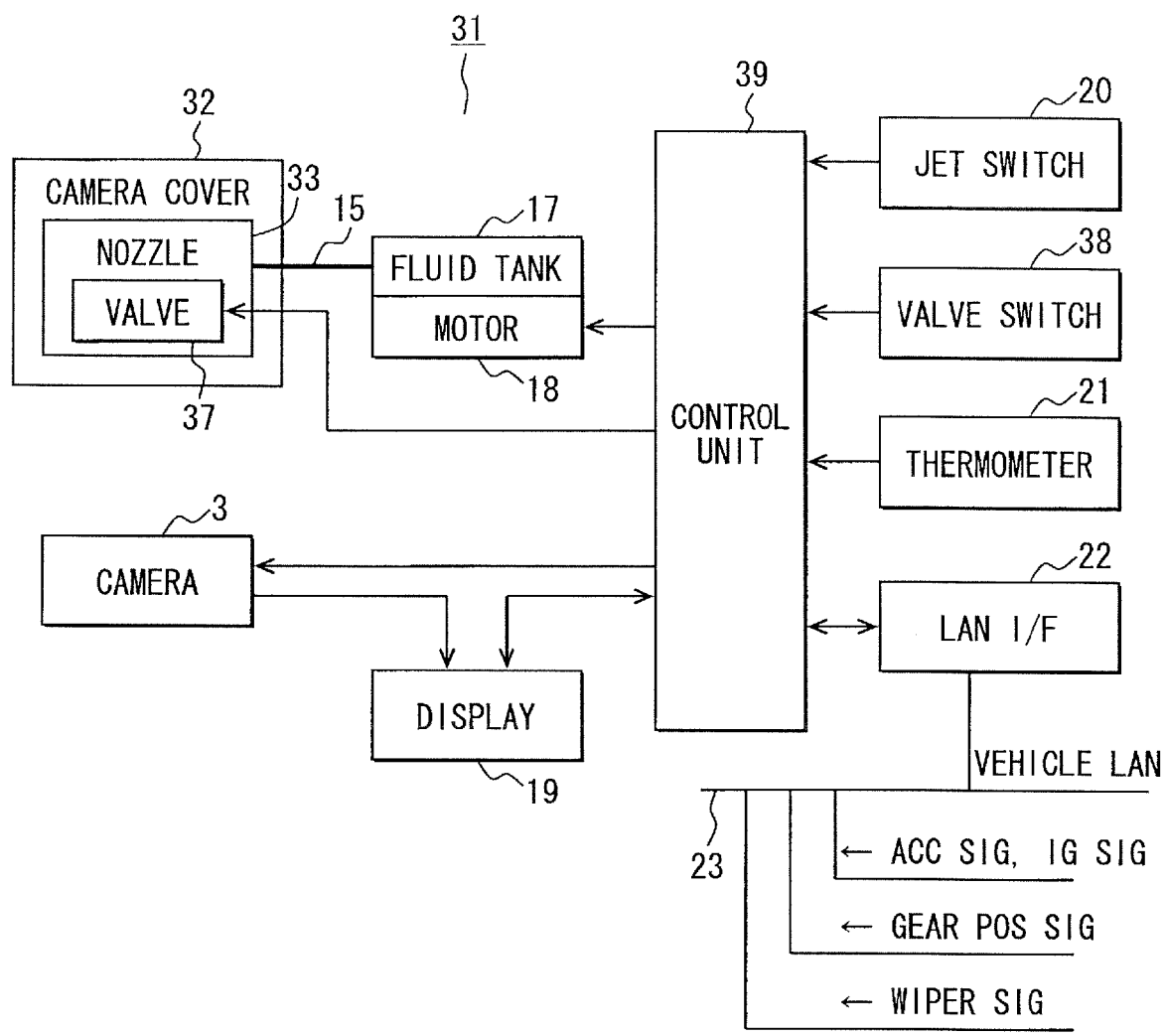
FIG. 7 shows a function block diagram of the optical sensor device in the second embodiment, corresponding to FIG. 4.
Figure 8:
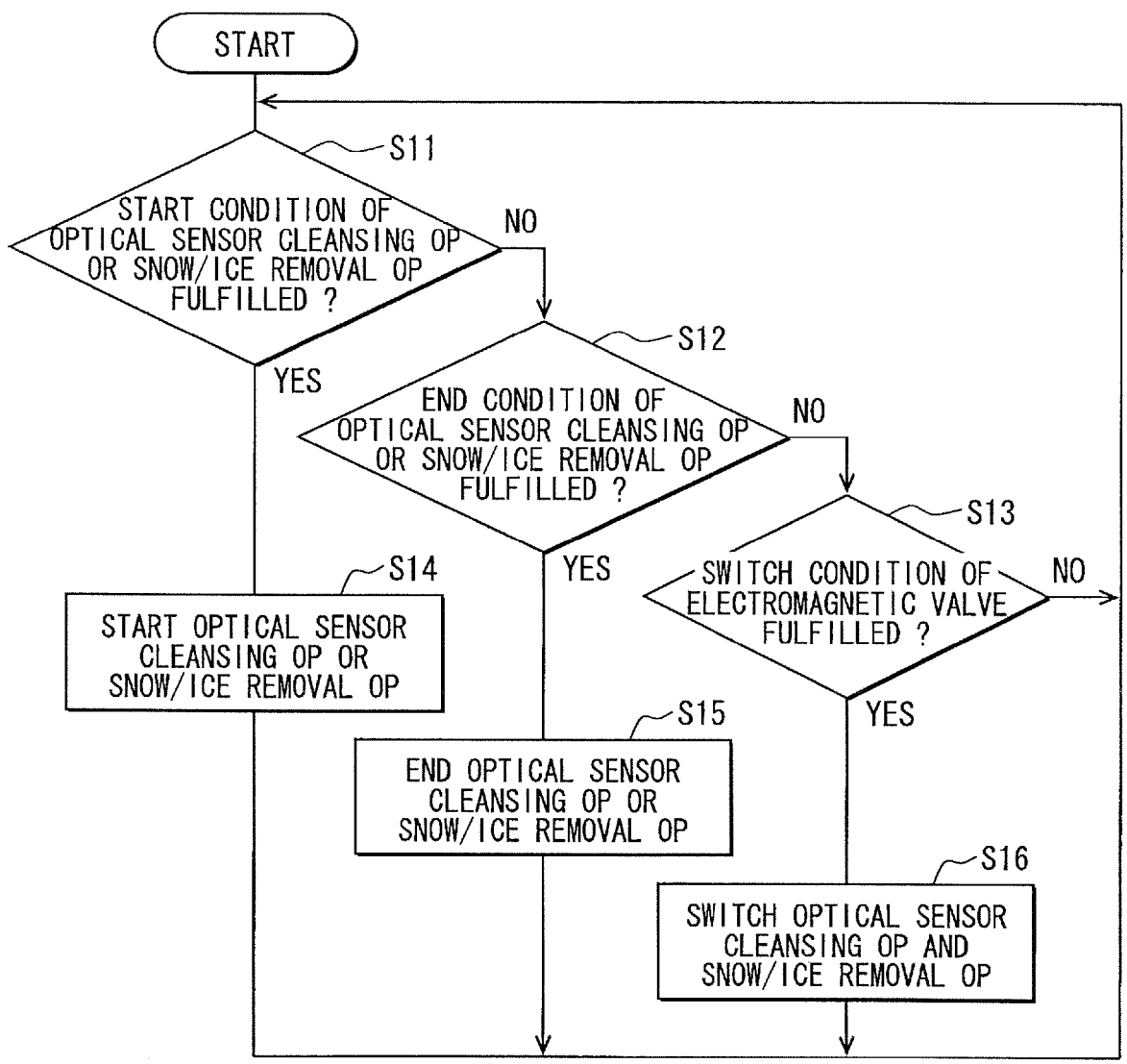
FIG. 8 shows a flow chart of a process in the optical sensor device in the second embodiment, corresponding to FIG. 5.
Figure 10:
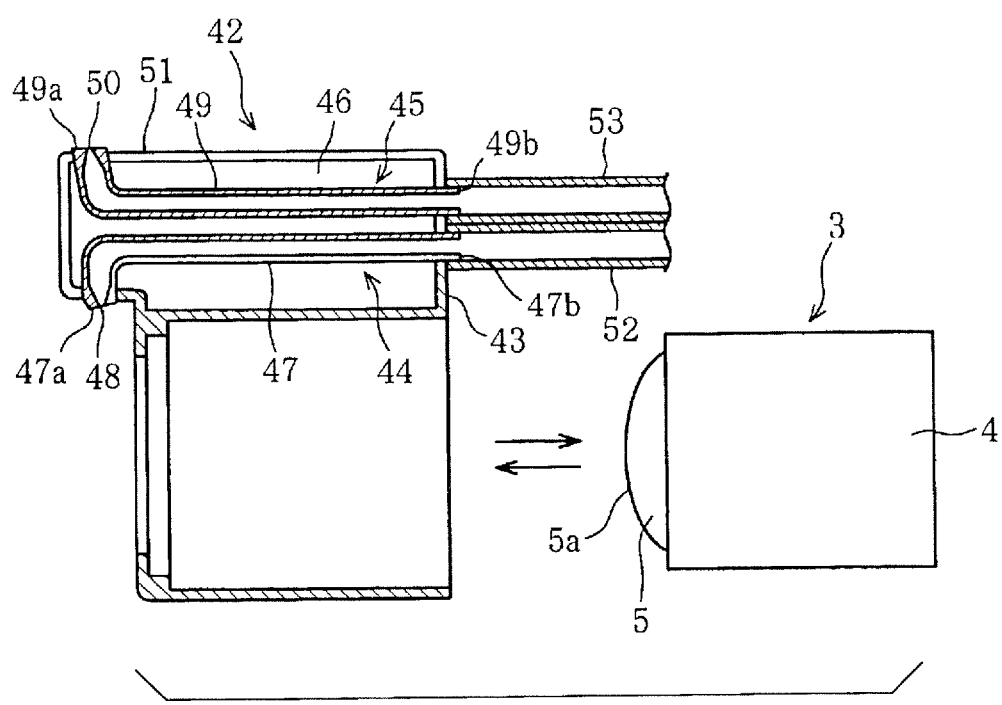
FIG. 10 shows an exploded view of a camera cover and a camera in the third embodiment, corresponding to FIG. 2.
Figure 11:
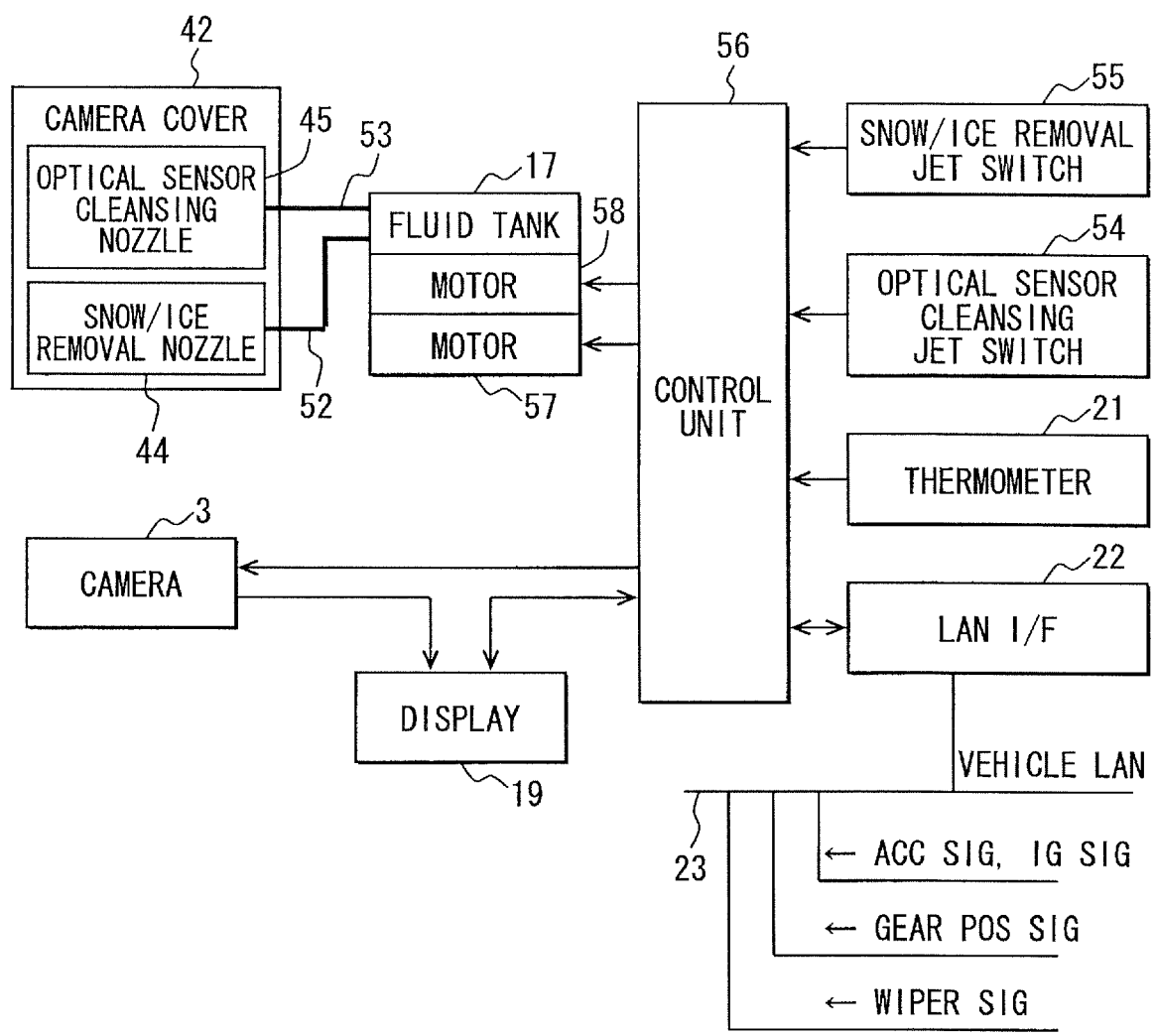
FIG. 11 shows a function block diagram of the optical sensor device in the third embodiment, corresponding to FIG. 4.
Figure 12:
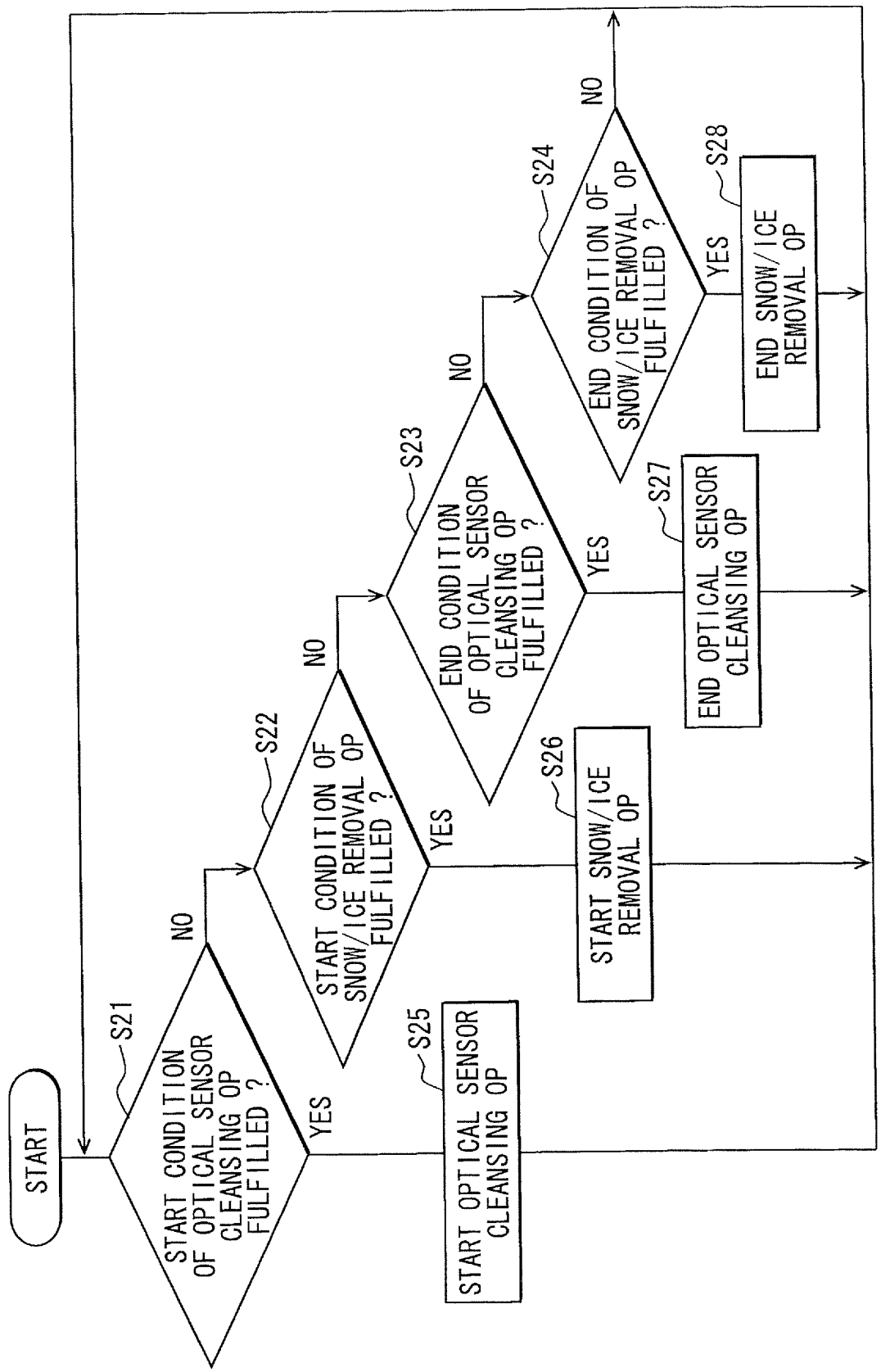
FIG. 12 shows a flow chart of a process in the optical sensor device in the third embodiment, corresponding to FIG. 5.

That is, as shown in FIGS. 6A/6B, a nozzle 33 includes a passage 34 for passing the cleansing fluid, and one of branched-off ends in a downward direction has, at its end 34a, an optical sensor cleansing orifice 35 that is exposed from the body 6, and the other branched-off end in an upward direction has, at its end 34b, a snow/ice removal orifice 36 that is exposed from the body 6. In addition, an electro-magnetic valve 37 (i.e., a jet pressure adjustment unit in claims) is disposed at a branch point. The electro-magnetic valve 37 switches between two conditions: a jetting of the cleansing fluid only from the optical sensor cleansing orifice 35 by intercepting the flow of the cleaning fluid to the snow/ice removal orifice 36 and a jetting of the cleansing fluid only from the snow/ice removal orifice 36 by intercepting the flow of the cleaning fluid to the optical sensor cleansing orifice 35.

An electro-magnetic valve switch 38 is a switch operable by the user, and outputs an operation detection signal to the control unit 39 when operated by the user. When the control unit 39 has an input of the operation detection signal from the electro-magnetic valve switch 38, it changes an output level of a drive instruction signal to the electro-magnetic valve 37. In addition, electro-magnetic valve switch 38 may be a mechanical switch, or it may be a touch switch formed on a display screen of the liquid crystal display device 19.

The electro-magnetic valve 37 controls the cleansing fluid jetted only from the optical sensor cleansing fluid 35 in a period when, for example, the drive instruction signal in a high level is input from the control unit 39, or controls the cleaning fluid jetted only from the snow/ice removal orifice 36 in a period when the drive instruction signal in a low level is input from the control unit 39.

The control unit 39 determines whether a start condition of the optical sensor cleansing operation or the snow/ice removal operation is fulfilled (step S11), and determines an end condition of the optical sensor cleansing operation or the snow/ice removal operation is fulfilled, when it is in a power-on condition (i.e., when the optical sensor unit 1 is in a working condition) (step S12), and determines a switch condition of the electro-magnetic valve 37 is fulfilled (step S13).

When the control unit 39 determines that the start condition of the optical sensor cleansing operation or the snow/ice removal operation is fulfilled, based on fulfillment of at least one of several conditions of, an input of the operation detection signal from the jet switch 20 according to the user operation thereof, turning-on of the ACC switch or the IG switch according to an input signal from the vehicle LAN interface unit 22, temperature of the body 6 of the camera cover 2 being lower than a preset temperature according to the temperature signal from the device thermometer 21, or having obstruction in the sight of the camera 3 according to the image displayed on the liquid crystal display device 19 (step S11, YES), the control unit 39 outputs the drive instruction signal to the motor 18, to start the optical sensor cleansing operation and the snow/ice removal operation (step S14). In this case, the cleansing fluid stored in the tank 17 is jetted at high pressure toward the lens surface 5a of the lens 5 of the camera 3 from the optical sensor cleansing orifice 35 if the electro-magnetic valve 37 is switched to flow the cleansing fluid only to the optical sensor cleansing orifice 35, or the cleansing fluid is jetted at high pressure toward an area including in the upper space of the lens surface 5a and the upper space of the top surface 14 of the body 6 from the snow/ice removal orifice 36 if the electro-magnetic valve 37 is switched to flow the cleaning fluid only to the snow/ice removal orifice 36.

Thereafter, when the control unit 39 determines that the end condition of the optical sensor cleansing operation or the snow/ice removal operation is fulfilled, based on fulfillment of at least one of several conditions of, an input of the operation detection signal from the jet switch 20 according to the user operation thereof, turning-off of the ACC switch or the IG switch according to an input signal from the vehicle LAN interface unit 22, temperature of the body 6 of the camera cover 2 being equal to or higher than the preset temperature according to the temperature signal from the device thermometer 21, having no obstruction in the sight of the camera 3 according to the image displayed on the liquid crystal display device 19, or a lapse of a preset time from a start of the sensor cleansing operation or the snow/ice removal operation, after starting of the sensor cleansing operation or the snow/ice removal operation (step S12, YES), the control unit 39 stops to output the drive instruction signal to the motor 18 to stop the motor 18, for stopping the optical sensor cleansing operation or the snow/ice removal operation (step S15).

In addition, when the control unit 39 determines that the switch condition of the electro-magnetic valve 37 is fulfilled, based on fulfillment of at least one of several conditions of, an input of the operation detection signal from the electro-magnetic valve switch 38 according to the user operation thereof, or a lapse of a preset time from a start of the sensor cleansing operation or the snow/ice removal operation, after starting of the sensor cleansing operation or the snow/ice removal operation (step S13, YES), it changes an output level of the drive instruction signal to the electro-magnetic valve 37, for switching between the optical sensor cleansing operation and the snow/ice removal operation (step S16).

In addition, in the above configuration of switching between the optical sensor cleansing operation and the snow/ice removal operation, the snow/ice removal operation may be started first, and the optical sensor cleansing operation may be started after finishing the snow/ice removal operation. That is, when the control unit 39 determines that the sight of the camera 3 is obstructed based on an image displayed on the liquid crystal display device 19, it may switch the electro-magnetic valve 37 to flow the cleansing fluid only to the snow/ice removal orifice 36 for starting the snow/ice removal operation, and when the control unit 39 determines that the sight of the camera 3 is not obstructed based on an image displayed on the liquid crystal display device 19, it may end the snow/ice removal operation, and may switches the electro-magnetic valve 37 to flow the cleansing fluid only to the optical sensor cleansing orifice 35 for starting the optical sensor cleansing operation.

In the second embodiment described above, because the optical sensor cleansing operation jetting the cleaning fluid toward the lens surface 5a of the lens 5 of the camera 3 and the snow/ice removal operation jetting the cleaning fluid toward an area including the upper space of the lens surface 5a are configured to be alternatively performed, decrease of jetting pressure of the cleansing fluid due to dividing the cleansing fluid into two directions is prevented, thereby allowing the jetting pressure of the cleansing fluid from the optical sensor cleansing orifice 25 and the snow/ice removal orifice 36 to be adjusted to an appropriate level, for suitably removing foreign matter from the lens surface 5a and for suitably removing snow or ice protruding in an eaves shape from the top surface 14 of the body 6 toward the front upper space of the lens surface 5a.

Third Embodiment

The third embodiment of the present invention is explained referring to FIGS. 9A to 12 in the following. The explanation is focused to differences of the present embodiment from the first embodiment, for the brevity of explanation. In the present embodiment, there are two passages separately for the fluid to be jetted from the optical sensor cleansing orifice and for the fluid to be jetted from the snow/ice removal orifice, in comparison to only one fluid passage in the first embodiment.

As shown in FIGS. 9A/9B, a camera cover 42 in an optical sensor unit 41 is configured to have, in an inside of the upper part of a body 43 of the camera cover 42, a nozzle housing 46 for housing an optical sensor cleansing nozzle 44 and a snow/ice removal nozzle 45. The optical sensor cleansing nozzle 44 and the snow/ice removal nozzle 45 run in parallel. The optical sensor cleansing nozzle 44 includes an optical sensor cleansing fluid passage 47 for passing the cleansing fluid, and, at an end 47a of the passage 47 branching-off in a downward direction, there is an optical sensor cleansing orifice 48 exposed from the body 43. The optical sensor cleansing orifice 48 is disposed in the upper front space of the lens surface 5a of the lens 5 of the camera 3, in the same manner as the optical sensor cleansing orifice 12 in the first embodiment, and has a downward jet direction (i.e., a direction shown as an "C" arrow in FIG. 9B) set toward the lens surface 5a from the upper front space of the lens surface 5a, for jetting the cleansing fluid toward the lens surface 5a.

The snow/ice removal nozzle 45 includes a snow/ice removal passage 49 for passing the cleansing fluid, and, at an end 49a of the passage 49 branching-off in an upward direction, there is a snow/ice removal orifice 50 exposed from the body 43. The snow/ice removal orifice 50 is disposed in the upper front space of the lens surface 5a of the lens 5 of the camera 3 and, at the same time, in the upper space of the optical sensor cleansing orifice 48, in the same manner as the snow/ice removal orifice 13 in the first embodiment, and has an upward jet direction (i.e., a direction shown as a "D" arrow in FIG. 9B) set toward an area including the upper space of the lens surface 5a and, at the same time, the upper space of a top surface 51 of the body 43 (i.e., an area "Q" in FIG. 9B), for jetting the cleansing fluid toward an area including the upper space of the lens surface 5a and the upper space of the top surface 14 of the body 6. In addition, the jet direction of the cleansing fluid from the snow/ice removal orifice 50 is also outside of an imaging angle of the camera 3. A base 47b of the passage 47 has a flexible tube 52 connected at a back side of the body 43, and a base 49b of the passage 49 has a flexible tube 53 connected at a back side of the body 43.

An optical sensor cleansing jet switch 54 is a switch which is operable by a user, and outputs an operation detection signal to the control unit 56 upon having a user operation. Upon having an input of the operation detection signal from the switch 54, the control unit 56 drives a motor 57 in the cleansing fluid tank 17 by outputting a drive instruction signal to the motor 57. The motor 57 in operation provides the cleansing fluid from the tank 17 to the optical sensor cleansing nozzle 44 through the tube 52, and to the optical sensor cleansing orifice 48 to be jetted toward the lens surface 5a of the lens 5 of the camera 3 at high pressure applied thereto.

An snow/ice removal jet switch 55 is a switch which is operable by a user, and outputs an operation detection signal to the control unit 56 upon having a user operation. Upon having an input of the operation detection signal from the switch 55, the control unit 56 drives a motor 58 in the cleansing fluid tank 17 by outputting a drive instruction signal to the motor 58. The motor 58 in operation provides the cleansing fluid from the tank 17 to the snow/ice removal nozzle 45 through the tube 53, and to the snow/ice removal orifice 50 to be jetted toward an area including the upper space of the lens surface 5a and the upper space of the top surface 51 of the body 43 at high pressure applied thereto. Though, in the above-described configuration, the cleansing fluid is provided from the tank 17 to both of the optical sensor cleansing orifice 48 and the snow/ice removal orifice 50, there may be two cleansing fluid tanks, and one of two tanks may provide one cleansing fluid for the optical sensor cleansing orifice 48 and the other tank may provide another cleansing fluid for the snow/ice removal orifice 50.

The control unit 56 determines whether a start condition of the optical sensor cleansing operation (step S1), and determines whether a start condition of the snow/ice removal operation is fulfilled (step S22), and determines an end condition of the optical sensor cleansing operation (step S23), and determines whether an end condition of the snow/ice removal operation is fulfilled (step S24), when it is in a power-on condition (i.e., when the optical sensor unit 41 is in a working condition).

When the control unit 56 determines that the start condition of the optical sensor cleansing operation is fulfilled (step S21, YES), based on fulfillment of, for example, an input of the operation detection signal from the optical sensor cleansing jet switch 54 according to the user operation thereof, the control unit 56 outputs the drive instruction signal to the motor 56 for driving the motor 57 and for starting the optical sensor cleansing operation (step S25). In this case, the cleansing fluid stored in the tank 17 is jetted from the optical sensor cleansing orifice 48 toward the lens surface 5a of the lens 5 of the camera 3.

In addition, when the control unit 56 determines that the start condition of the snow/ice removal operation is fulfilled, based on fulfillment of at least one of several conditions of, an input of the operation detection signal from the switch 55 according to the user operation thereof, turning-on of the ACC switch or the IG switch according to an input signal from the vehicle LAN interface unit 22, temperature of the body 43 of the camera cover 42 being lower than a preset temperature according to the temperature signal from the device thermometer 21, or having obstruction in the sight of the camera 3 according to the image displayed on the liquid crystal display device 19 (step S22, YES), the control unit 56 outputs the drive instruction signal to the motor 57, to start the snow/ice removal operation (step S26). In this case, the cleansing fluid stored in the tank 17 is jetted from the snow/ice removal orifice 50 toward an area that includes the upper space of the lens surface 5a and the upper space of the top surface 51 of the body 43.

Further, when the control unit 56 determines that the end condition of the optical sensor cleansing operation is fulfilled (step S23, YES), based on fulfillment of, for example, an input of the operation detection signal from the optical sensor cleansing jet switch 54 according to the user operation thereof, the control unit 56 stops to output the drive instruction signal to the motor 57 for stopping the motor 57 and for ending the optical sensor cleansing operation (step S27).

Further, when the control unit 56 determines that the end condition of the snow/ice removal operation is fulfilled, based on fulfillment of at least one of several conditions of, an input of the operation detection signal from the snow/ice removal jet switch 55 according to the user operation thereof, turning-off of the ACC switch or the IG switch according to an input signal from the vehicle LAN interface unit 22, temperature of the body 43 of the camera cover 42 being equal to or higher than the preset temperature according to the temperature signal from the device thermometer 21, having no obstruction in the sight of the camera 3 according to the image displayed on the liquid crystal display device 19, or a lapse of a preset time from a start of the snow/ice removal operation, after starting of the snow/ice removal operation (step S24, YES), the control unit 56 stops to output the drive instruction signal to the motor 58 to stop the motor 58, for stopping the snow/ice removal operation (step S28).

In this case, the conditions may be arbitrarily combined to start and end the snow/ice removal operation. That is, the control unit 56 may start the snow/ice removal operation in response to turning-on of the ACC switch or the IG switch, and may end the snow/ice removal operation in response to the user operation of the snow/ice removal jet switch 55.

In the third embodiment described above, the optical sensor cleansing passage 47 for passing the cleansing fluid to be jetted toward the lens surface 5a of the lens 5 of the camera 3 and the snow/ice removal passage 49 for passing the cleansing fluid to be jetted toward an area including the upper space of the lens surface 5a are formed as two separate passages, a fluid for removing foreign matter on the lens surface 5a and a fluid for removing snow or ice protruding into the front upper space of the lens surface 5a from the top surface 1 of the body 43 may be separately provided, that is, may be the same fluid or two different fluids, thereby arbitrarily determined depending on the environment or implementation limitations. Further, the jetting of the fluid from the optical sensor cleansing orifice 48 and the jetting of the fluid from the snow/ice removal orifice 50 may be independently performed.

Modification of the First to Third Embodiments

The present invention is not necessarily limited to the above embodiments, but may be modified or expanded into the following forms.

The optical sensor may be a device other than the camera 3, as long as it has a lens and can optically measure a physical quantity, such as laser sensors or the like.

The fluid may be a compressed air or the like, and the compressed air may be jetted from the snow/ice removal orifice 50 while the cleansing fluid is jetted from the optical sensor cleansing orifice 48 in the third embodiment. Further, the cleansing fluid and/or the compressed air may be heated by a heater before jetted from the orifice. In this manner, the snow/ice on the lens surface 5a of the lens 5 of the camera 3 can be securely removed, and the snow or ice protruding into the front upper space of the lens surface 5a of the lens 5 of the camera 3 from the top surface 14 of the body 6 can be securely removed.

As the start condition of the optical sensor cleansing operation, the following conditions may be included. That is, detection of a gear shift into a rear (backing) position, detection of wiper operation, detection of an attached object in an image may be used as the start condition. Further, these conditions may be used as a combination.

The camera cover 2 may have a weight sensor for detecting a weight on the top surface 14 of the body 6 of the cover 2, and the detected weight on the top surface 14 exceeding a threshold may start the snow/ice removal operation, and after starting the snow/ice removal operation by turning on a heater switch, the snow/ice removal operation may end upon detecting the weight on the top surface 14 below the threshold.

A curved surface may be provided as the top surface 14 of the body 6 of the camera cover 2, so that making it hard for snow to be accumulated on the top surface 14 of the body 6, or so that making it easy for snow on the top surface 14 to be removed.

By counting the number of times of the optical sensor cleansing operation and by determining that the foreign matter is not removed after a predetermined times of cleansing operation or after a predetermined duration of cleansing operation, the unsuccessful cleansing operation may be notified for the user. The notification of unsuccessful cleansing operation may be performed as a display of information screen on a display unit, or a guidance sound may be output from a speaker (not illustrated), or a vibration/electrical stimulation may be provided from a steering wheel or from a seat having a vibration/electrical stimulation generator. Further, different types of notification may be combined. That is, at least one of visual sensation, hearing sensation, or tactile sensation may be employed for notification.

After starting the snow/ice removal operation, the optical sensor cleansing operation may be automatically started, and such configuration enables removal of water drops by the optical sensor cleansing operation even when water drops coming from dripping of melted snow/ice due to the snow/ice removal operation are attached on the lens surface 5a of the lens 5 of the camera 3.

The lens surface 5a of the lens 5 of the camera 3 may have a treatment such as a water-repellant treatment, a hydrophilic treatment, a photocatalyst treatment, or an antifouling treatment, to have a water-repellant coating, a hydrophilic coating, a photocatalyst coating, or an antifouling coating. In this manner, the lens surface 5a may be prevented from having foreign matter attached thereon, and/or the lens surface 5a may be appropriately washed even when foreign matter is attached on the surface 5a.

The cleansing fluid may be jetted downward from the snow/ice removal orifice 13, instead of upward, by having the orifice 13 at a position above the top surface 14 of the body 6, for removing the accumulated snow on the top surface 14 of the body 6. In addition, the fluid may be jetted sideways by having the orifice 13 at a side position above the top surface 14 of the body 6, for removing the accumulated snow on the top surface 14 of the body 6.

The fluid jetting direction may be any direction, other than the upward direction or the like for including the upper space of the top surface 14 of the body 6, as long as the jetted fluid effectively removes the snow or ice that obstacles the sight of the optical sensor. That is, as shown in FIGS. 13A to 15B, the fluid jetting direction may be level, or in a horizontal direction.

Figure 13A:
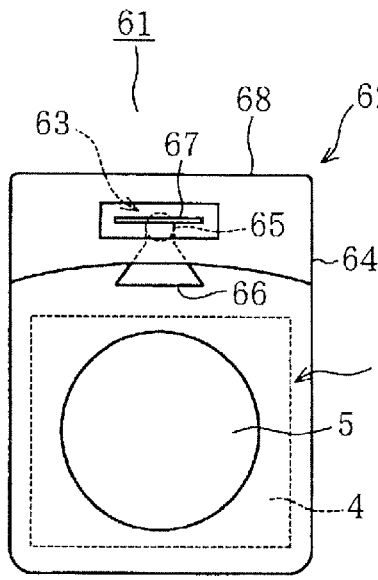
FIGS. 13A/13B show illustrations of (a) a front face and (b) a cross section of a side face of an optical sensor device in modification of the first to third embodiments of the present invention.
Figure 13B:
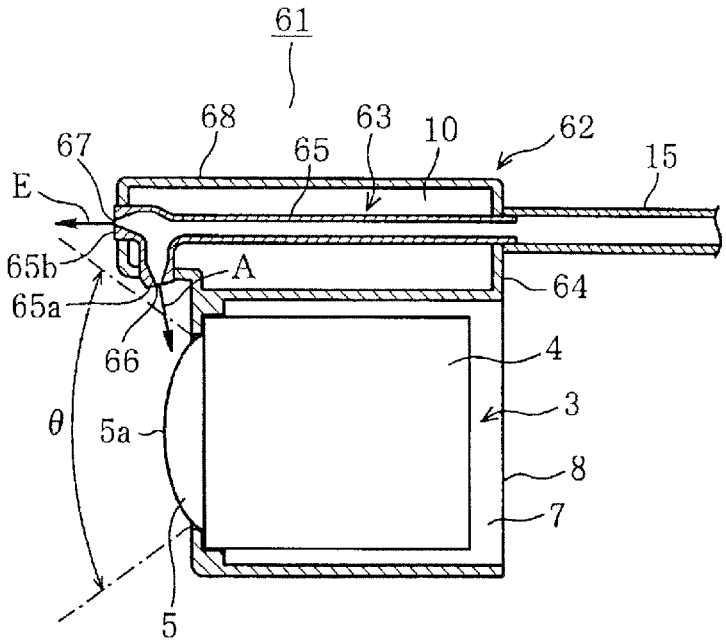

In FIGS. 13A/13B, a nozzle 63 may be accommodated in a body 64 of a camera cover 62 of an optical sensor unit 61, and at a downward branching end 65a of a passage 65, an optical sensor cleansing orifice 66 may be provided in an exposed manner from a body 64, and at a horizontal branching end 65b of the passage 65, a snow/ice removal orifice 67 may be provided in an exposed manner from the body 64. In this manner, the cleansing fluid is jetted from the orifice 66 toward the lens surface 5a of the lens 5 of the camera 3, and at the same time, the cleansing fluid is jetted from the orifice 67 in a horizontal direction. In this configuration jetting the fluid in the horizontal direction, the jetted fluid may not melt and remove the snow or ice in an upper space relative to a jetting direction E in FIG. 13B, but the hanging snow or ice from above the lens surface 5a of the lens 5, covering the surface 5a, is melted by the fluid from the orifice 67 due to the position of the orifice 67 above the lens surface 5a, thereby securing the sight of the camera 3.

Figure 14A:
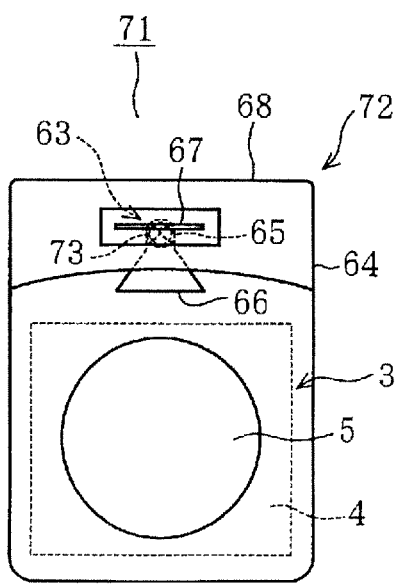
FIGS. 14A/14B show illustrations of (a) a front face and (b) a cross section of a side face of an optical sensor device in modification of the first to third embodiments of the present invention, corresponding to FIGS. 13A/13B.
Figure 14B:
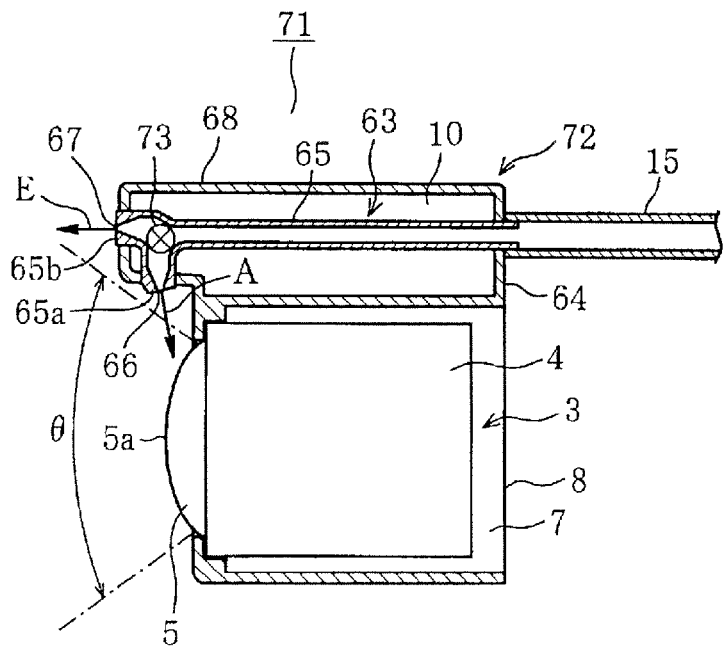

In addition, as shown in FIGS. 14A/14B, the nozzle 63 may be accommodated in the body 64 of a camera cover 72 of an optical sensor unit 71, and at the downward branching end 65a of the passage 65, the optical sensor cleansing orifice 66 may be provided in an exposed manner from the body 64, and at the horizontal branching end 65b of the passage 65, the snow/ice removal orifice 67 may be provided in an exposed manner from the body 64, having an electro-magnetic valve 73 at the branching point of the passage 65.

Further, as shown in FIGS. 15A/15B, a camera cover 82 in an optical sensor unit 81 may have the optical sensor cleansing nozzle 44 and an snow/ice removal nozzle 83. The optical sensor cleansing nozzle 44 and the snow/ice removal nozzle 83 run in parallel relative to a body 84. The snow/ice removal nozzle 83 may include a snow/ice removal passage 85, and, at an end 85a of the passage 85, a snow/ice removal orifice 86 may be disposed in an exposed manner from the body 84 for jetting the cleansing fluid in a horizontal direction. In this case, too, the jetted fluid may not melt and remove the snow or ice in an upper space relative to a jetting direction F in FIG. 15B, but the hanging snow or ice from above the lens surface 5a of the lens 5, covering the surface 5a, is melted by the fluid from the orifice 86 due to the position of the orifice 86 above the lens surface 5a, thereby securing the sight of the camera 3.

When a transparent cover glass is disposed in front of the lens surface 5a of the lens 5 of the camera 3, the fluid may be jetted toward the glass surface of the cover glass, as shown in FIGS. 16A to 18B, instead of jetted toward the lens surface 5a of the lens 5 of the camera 3.

In other words, a camera cover 92 of an optical sensor unit 91 may have a cover glass 93 made of a transparent member in front of the lens surface 5a of the lens 5 of the camera 3, as shown in FIG. 16B, and the nozzle 9 in the first embodiment may be disposed for jetting the cleaning fluid toward a glass surface 93a of the cover glass 93 from the optical sensor cleansing orifice 12.

Figure 17A:
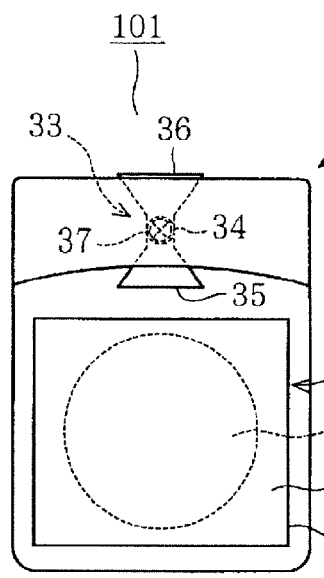
FIGS. 17A/17B show illustrations of (a) a front face and (b) a cross section of a side face of an optical sensor device in modification of the first to third embodiments of the present invention, corresponding to FIGS. 13A/13B.
Figure 17B:
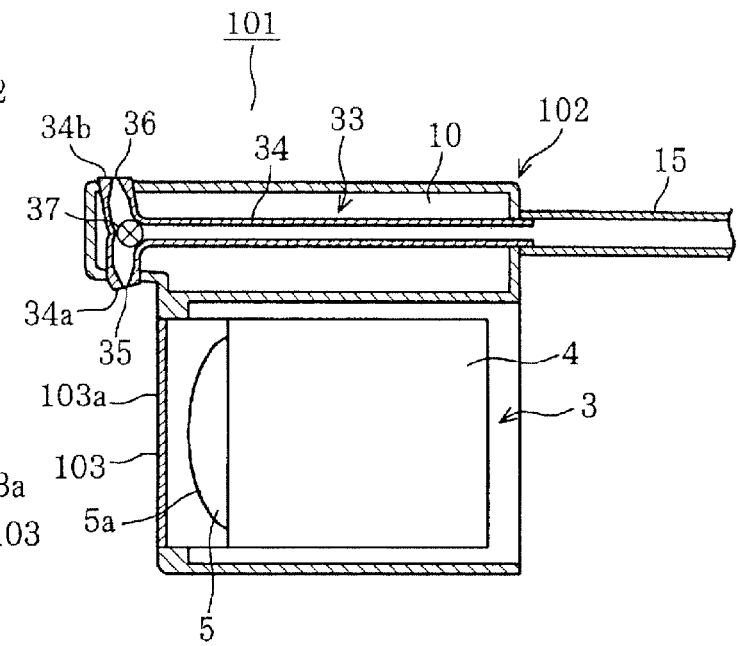

Further, a camera cover 102 of an optical sensor unit 101 may have a cover glass 103 made of the transparent member in front of the lens surface 5a of the lens 5 of the camera 3, as shown in FIGS. 17A/17B, and the nozzle 33 in the second embodiment may be disposed for jetting the cleaning fluid toward a glass surface 103a of the cover glass 103 from the optical sensor cleansing orifice 35.

Figure 18A:
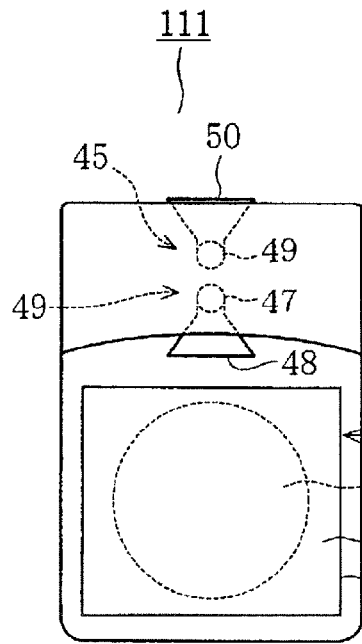
FIGS. 18A/18B show illustrations of (a) a front face and (b) a cross section of a side face of an optical sensor device in modification of the first to third embodiments of the present invention, corresponding to FIGS. 13A/13B, FIGS. 19A/19B show illustrations of (a) a front face and (b) a cross section of a side face of an optical sensor device in a fourth embodiment of the present invention.
Figure 18B:
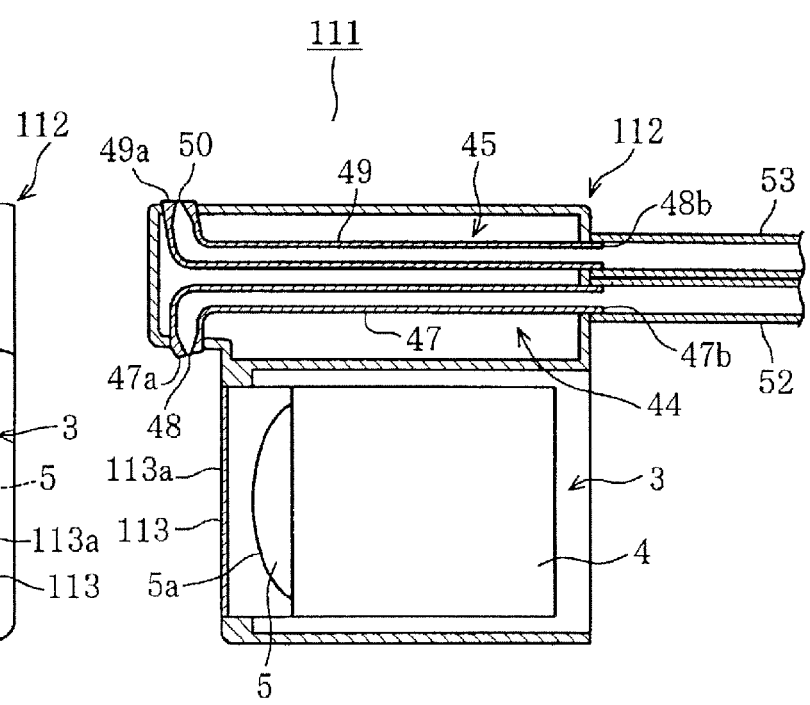

Furthermore, a camera cover 112 of an optical sensor unit 111 may have a cover glass 113 made of the transparent member in front of the lens surface 5a of the lens 5 of the camera 3, as shown in FIGS. 18A/18B, and the optical sensor cleansing nozzle 44 in the third embodiment and the snow/ice removal nozzle 45 may be disposed, and the cleaning fluid may be jetted toward a glass surface 113a of the cover glass 113 from the optical sensor cleansing orifice 48.

In a configuration that the cover glass faces the lens 5 of the camera 3, the fluid may be the compressed air instead of or in addition to the cleansing water. In addition, the heater heating the cleansing fluid and/or the compressed air may be provided, and the cleaning fluid and/or the compressed air may be heated. In addition, the glass surface of the cover glass may be treated to have a water-repellant coating, a hydrophilic coating, a photocatalyst coating, or an antifouling coating. Furthermore, in the configuration that the cover glass faces the lens 5 of the camera 3, the snow/ice removal orifice may be configured to jet the cleaning fluid in a horizontal direction, as shown in FIGS. 13A to 15B.

In the configuration that the cover glass faces the lens 5 of the camera 3, a wiper for wiping the glass surface of the cover glass, a rotation mechanism for rotating the cover glass, a vibration mechanism for vibrating the cover glass by using a sound wave or a low frequency wave, an air jetting mechanism for jetting air toward the glass surface of the cover glass or similar mechanism may be provided, and after the optical sensor cleansing operation, the glass surface of the cover glass may be wiped, or the cover glass may be rotated, or the cover glass may be vibrated by the sound/low frequency wave, or the cover glass may have the jetted air on the glass surface. In this manner, the cleansing fluid is not left attached on the glass surface of the cover glass.

The optical sensor unit 1 may be disposed, in addition to a position above the rear window 203 of the vehicle body 201, at a position under a side mirror that is installed on a side of the vehicle, for imaging a rear side of the vehicle. That is, a camera 3 may be disposed at two or more positions.

In the above-described embodiments, the optical sensor unit 1 and the control unit 16 are respectively included as a required element of the vehicle optical sensor. However, the control unit 16 may be configured as a part of the camera cover 2.

Fourth Embodiment

Figure 19A:
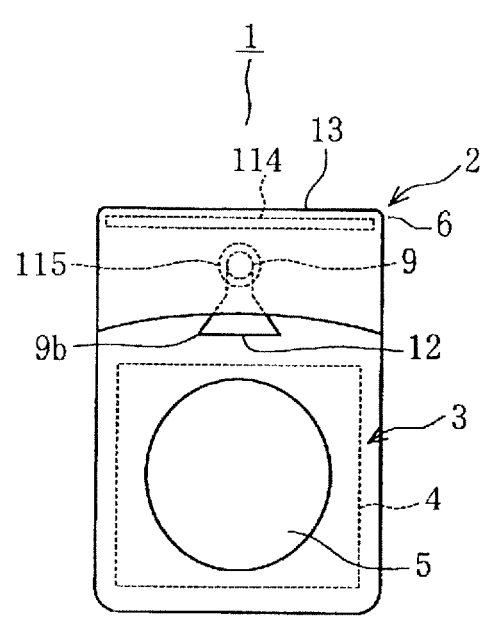
Figure 19B:
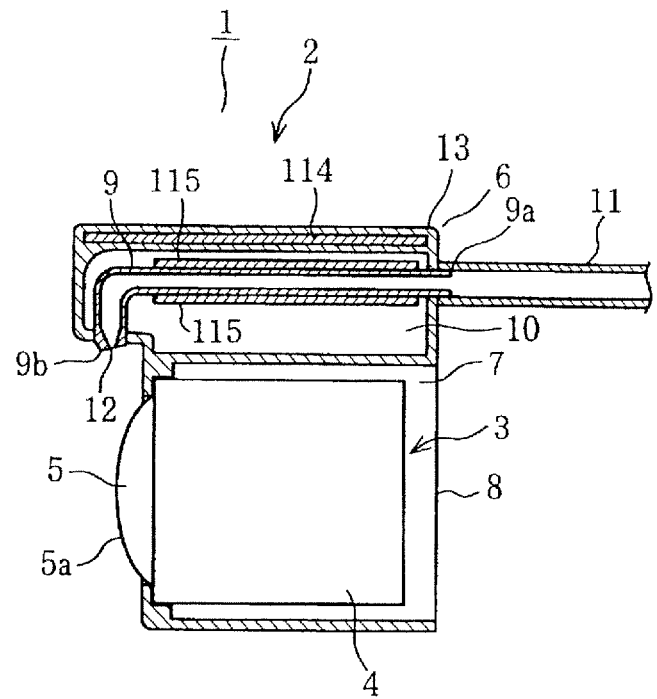

The fourth embodiment of the present invention, in which a camera is used as an optical sensor, is explained with reference to FIGS. 19A to 23. An optical sensor unit 1 (i.e., a vehicle optical sensor device in claims) includes, as shown in FIG. 19A, a camera cover 2 (i.e., a vehicle optical sensor cover in claims) and a camera 3 (i.e., an optical sensor in claims) detachably installed therein. A front side of a case 4 of the camera 3 has a lens 5 (i.e., FIG. 19A), and a back side of the case 4 (i.e., FIG. 19B) has a power supply line for supplying power to the camera 3 (not illustrated) and an image signal output line for outputting image signals (not illustrated) drawn out therefrom. The lens 5 is a fish-eye lens for capturing an image in a wide angle, having a lens surface 5a formed in a curved shape.

Figure 20:
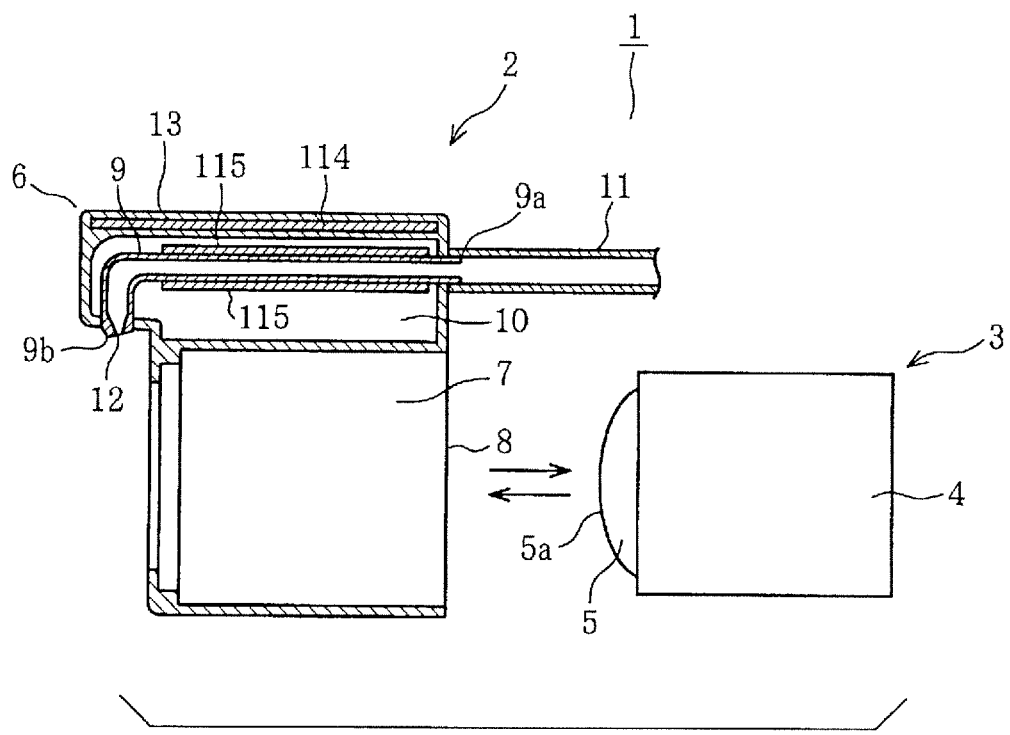
FIG. 20 shows an exploded view of a camera cover and a camera.

An inside of the lower part of a body 6 of the camera cover 2 is a camera housing 7 for housing the camera 3 (i.e., a body in claims), and a back side of the lower part of the body 6 has an opening 8. The camera 3 is, as shown in FIG. 20, installed in the camera housing 7 through the opening 8 from an outside of the camera housing 7, or taken out from the camera housing 7 through the opening 8 to the outside.

An inside of the upper part of a body 6 of the camera cover 2 is a cleansing nozzle housing 10 for housing a cleansing nozzle 9. In other words, the cleansing nozzle 9 is disposed in an upper space of the camera 3. The cleansing nozzle 9 has an "L" character shape, and a base 9a of the nozzle 9 is connected to a flexible tube 11 on the back side of the body 6, and an end 9b opens toward a downward direction to serve as a orifice 12. In this case, because of an eaves shape of a front upper portion of the body 6, the lens surface 5a of the lens 5 of the camera 3 is positioned in a right downward direction of the end 9b of the cleansing nozzle 9 (i.e., the orifice 12), when the camera 3 is normally accommodated in the camera housing 7 (i.e., in a condition of normal use as shown in FIGS. 19A/19B).

An upper surface heater 114 (i.e., a top heater in claims) is provided at an upper surface 13 of the body 6 of the camera cover 2 in a buried condition. The upper surface heater 114 is a heating wire, for example, and covers substantially an entire surface from the front to the back of the body 6. The heating wire dissipates heat when energized (i.e., is electrified), and the heat from the heating wire is transmitted to the upper surface 13 of the body 6 to be further dissipated to an outside (i.e., an upper space) of the body. The upper surface heater 114 of the present embodiment buried in such a way in the upper surface 13 may be modified to have a sheet heater form, for example, to be attached on a back side of the upper surface 13 of the body 6, as long as it heats the upper surface 13.

A cleansing nozzle heater 115 (i.e., a nozzle heater in claims) is provided for the cleansing nozzle 9, to circle around the cleansing nozzle 9 concerned. The cleansing nozzle heater 115 also is a heating wire, as is the upper surface heater 114 mentioned above, and covers an entirety of the body 6 from the front to the back. In this case, the heating wire dissipates heat when energized, and the heat from the heating wire is transmitted to the nozzle 9 toward the cleansing fluid flowing in the nozzle 9.

Figure 21:
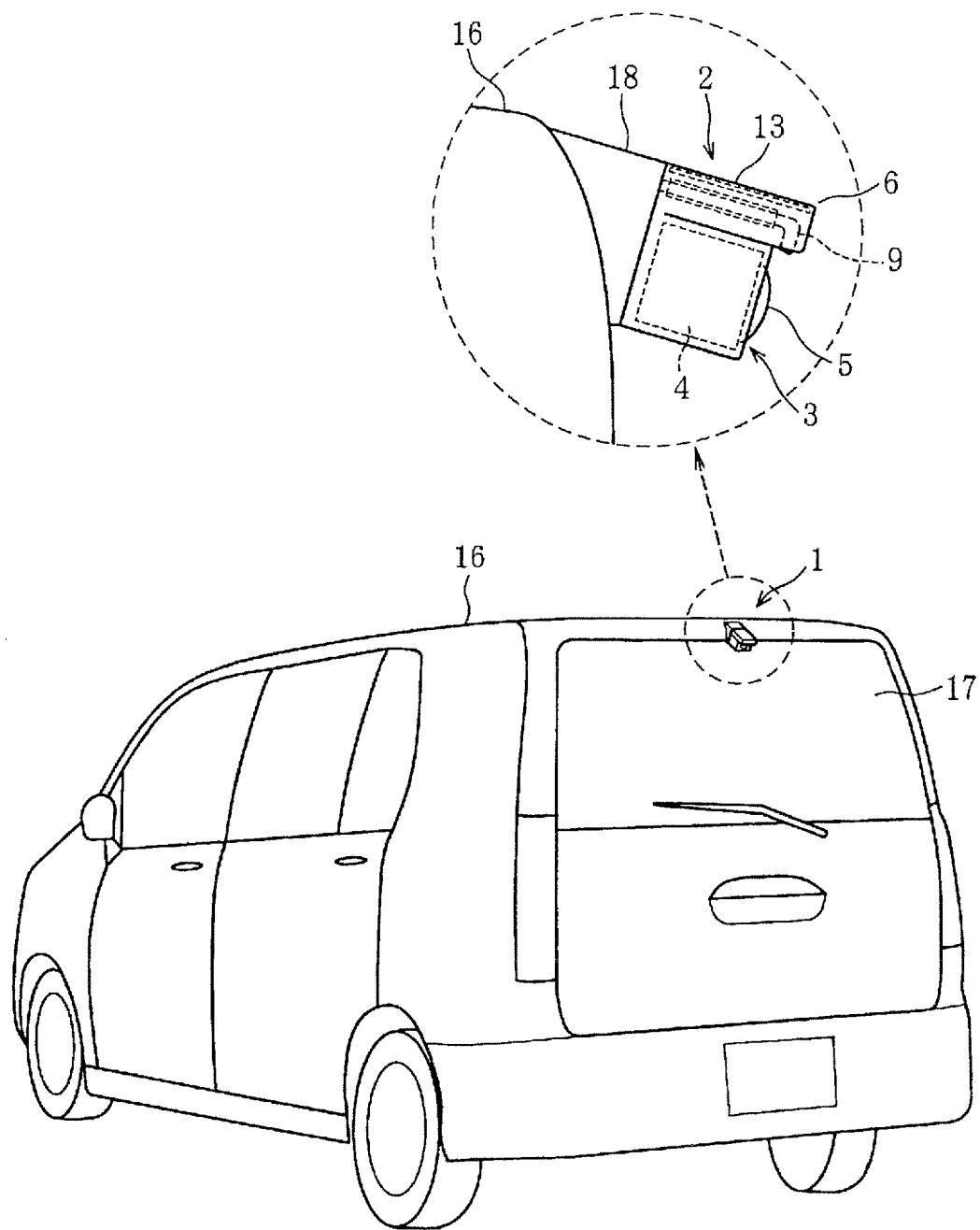
FIG. 21 shows a perspective view of the optical sensor device in a vehicle-installed condition.

The optical sensor unit 1 configured in the above-described manner is installed at an upper end of a rear window 17 of a vehicle body 16 by using a fitting metal 18, as shown in FIG. 21, for example, allowing the camera 3 to have a downward viewing direction relative to a level direction to have a back side view of the vehicle body 16, with the upper surface 13 of the body 6 of the camera cover 2 slanting from its back side to its front side. In other words, the camera 3 serves as a back view camera for viewing the back side of the vehicle when the vehicle is backing. Further, the slanting position of the camera 3, with the upper surface 13 of the body 6 of the camera cover 2, makes it difficult for snow to be accumulated on the upper surface 13, or makes it easy for snow to slide down and be removed from the upper surface 13 when snow is accumulated thereon.

Figure 22:
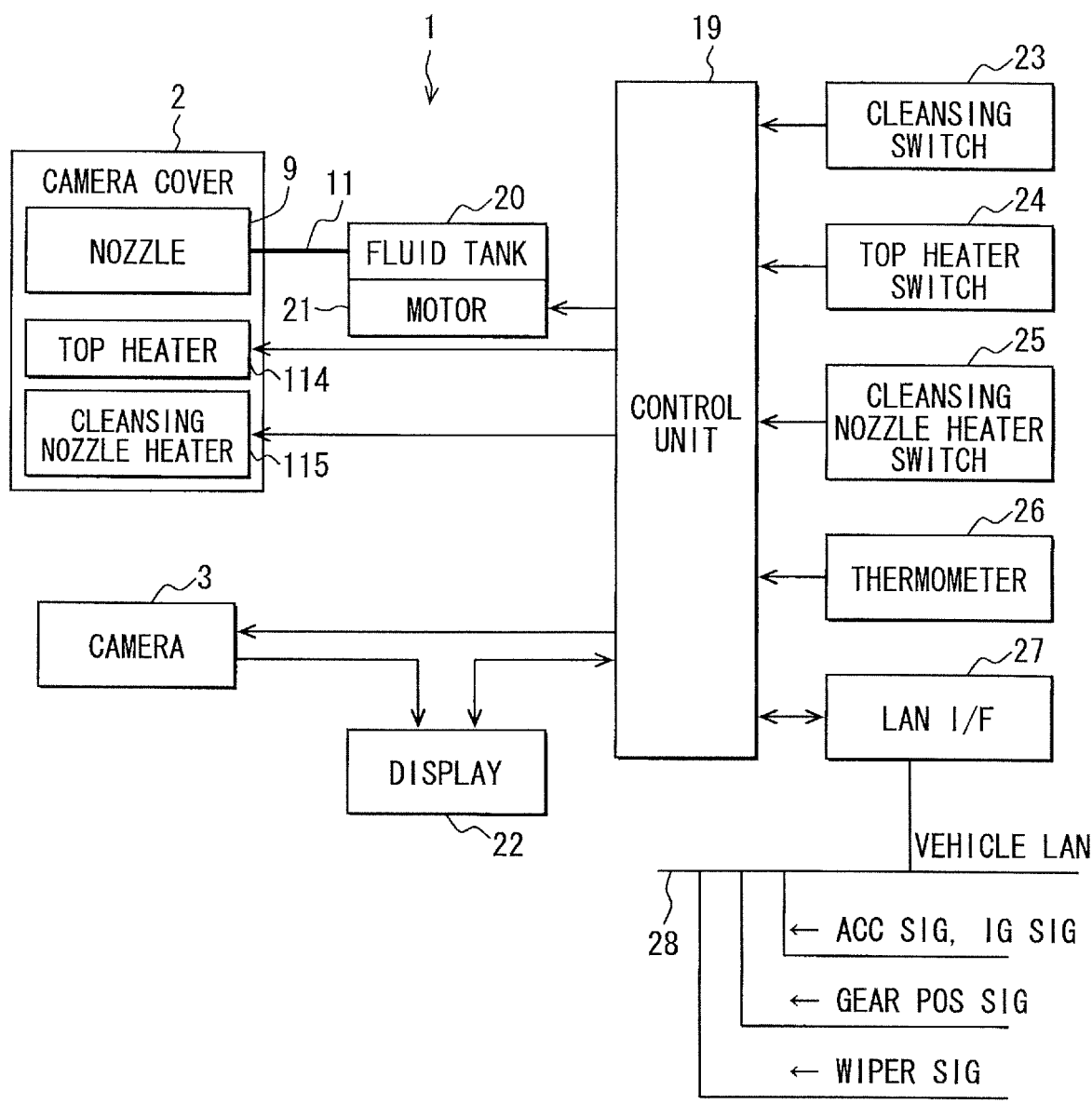
FIG. 22 shows a function block diagram of the optical sensor device.

FIG. 22 shows a function block diagram of electrical configuration of the optical sensor unit 1 and its peripheral circuit. The vehicle optical sensor device in the present invention includes the optical sensor unit 1 and a control unit 19 as indispensable elements. The control unit 19 (i.e., a control unit, a vehicle start-up detection unit, a vehicle start-up completion detection unit, a timer, a temperature detection unit, an image analyzer, an accumulation detection unit in claims) is constituted as a microcomputer with other parts, for controlling an imaging operation of the camera 3 and for controlling a cleansing operation by the cleansing nozzle 9 by driving a motor 21 in a cleansing fluid tank 20, as well as controlling a heating operation by the upper surface heater 114 and a heating operation by the cleansing nozzle heater 115, based on execution of a pre-stored control program.

In this case, when the motor 21 is driven, a cleansing fluid stored in the cleaning fluid tank 20 is supplied to the cleansing nozzle 9 through the tube 11, and the cleansing fluid supplied to the cleansing nozzle 9 is jetted toward the lens surface 5a of the lens 5 of the camera 3 from the orifice 12 by the water pressure. In this case, "jetting of the fluid" means providing the cleansing fluid in a mist form, providing the cleansing fluid in a larger granular form in comparison to the mist form for a suitable amount, or providing the cleansing fluid in a gushing manner in a lump of fluid for a fixed amount, for conceptually including all forms of jetting to achieve the intended effect of the present invention. Further, the cleansing fluid tank 20 is disposed in a well-known engine room in the vehicle body 16.

A liquid crystal display device 22 is disposed in a vehicle compartment, for displaying an image that corresponds to an inputted video signal from the camera 3, after decoding the inputted video signal. The control unit 19 analyzes the image displayed on the liquid crystal display device 22, and determines whether snow or ice is included in the image, and determines whether the sight of the camera 3 is obstructed by snow or ice.

A cleansing switch 23 is a switch which is operable by a user, and outputs an operation detection signal to the control unit 19 upon having a user operation. Upon having an input of the operation detection signal from the jet switch 20, the control unit 19 drives the motor 21 by outputting a drive instruction signal to the motor 21. The drive instruction signal output from the control unit 19 to the motor 21 is, for example, a level signal, and the cleansing operation by the cleansing nozzle 9 is performed while the level signal has a high level, indicating an ON condition.

An upper surface heater switch 24 is a switch that is operable by the user, and, when the user operates the upper surface heater switch 24, it outputs an operation detection signal to the control unit 19. Upon having an input of the operation detection signal from the switch 24, the control unit 19 outputs a drive instruction signal to the upper surface heater 114 for driving the heater 114. The drive instruction signal output from the control unit 19 to the heater 114 is, for example, also a level signal, and the heating operation by the heater 114 is performed while the level signal is in an ON condition.

A cleansing nozzle heater switch 25 is a switch that is operable by the user, and, when the user operates the cleansing nozzle heater switch 25, it outputs an operation detection signal to the control unit 19. Upon having an input of the operation detection signal from the switch 25, the control unit 19 outputs a drive instruction signal to the cleansing nozzle heater 115 for driving the heater 115. The drive instruction signal output from the control unit 19 to the heater 115 is, for example, also a level signal, and the heating operation by the heater 115 is performed while the level signal is in an ON condition. The above switches 23, 24, 25 may be mechanical switches, or touch switches on a display screen of the liquid crystal display device 22.

A device thermometer 26 measures temperature of the body 6 of the camera cover 2 (Le., temperature of the optical sensor unit 1), and the measured temperature is output as a temperature signal to the control unit 19. The control unit 19 having an input of the temperature signal from the device thermometer 26 then analyzes the temperature signal to detect temperature of the body 6 of the camera cover 2. In addition, the control unit 19 has a timer function to measure timing.

A vehicle LAN interface unit 27, having inputs of an ACC signal showing ON/OFF of an accessories (ACC) switch, an IG signal showing ON/OFF of an ignition (IG) switch, a gear position signal showing the position of a gear, a wiper operation signal showing an operation condition of a wiper and the like from various sensors and ECUs installed in the vehicle through a vehicle LAN 28, outputs the various input signals to the control unit 19. When the control unit 19 has various signals from the vehicle LAN interface unit 27, the control unit 19 analyzes the signals to detect ON/OFF of the ACC switch, ON/OFF of the IG switch, the position of the gear, the operation condition of the wiper and the like.

Figure 23:
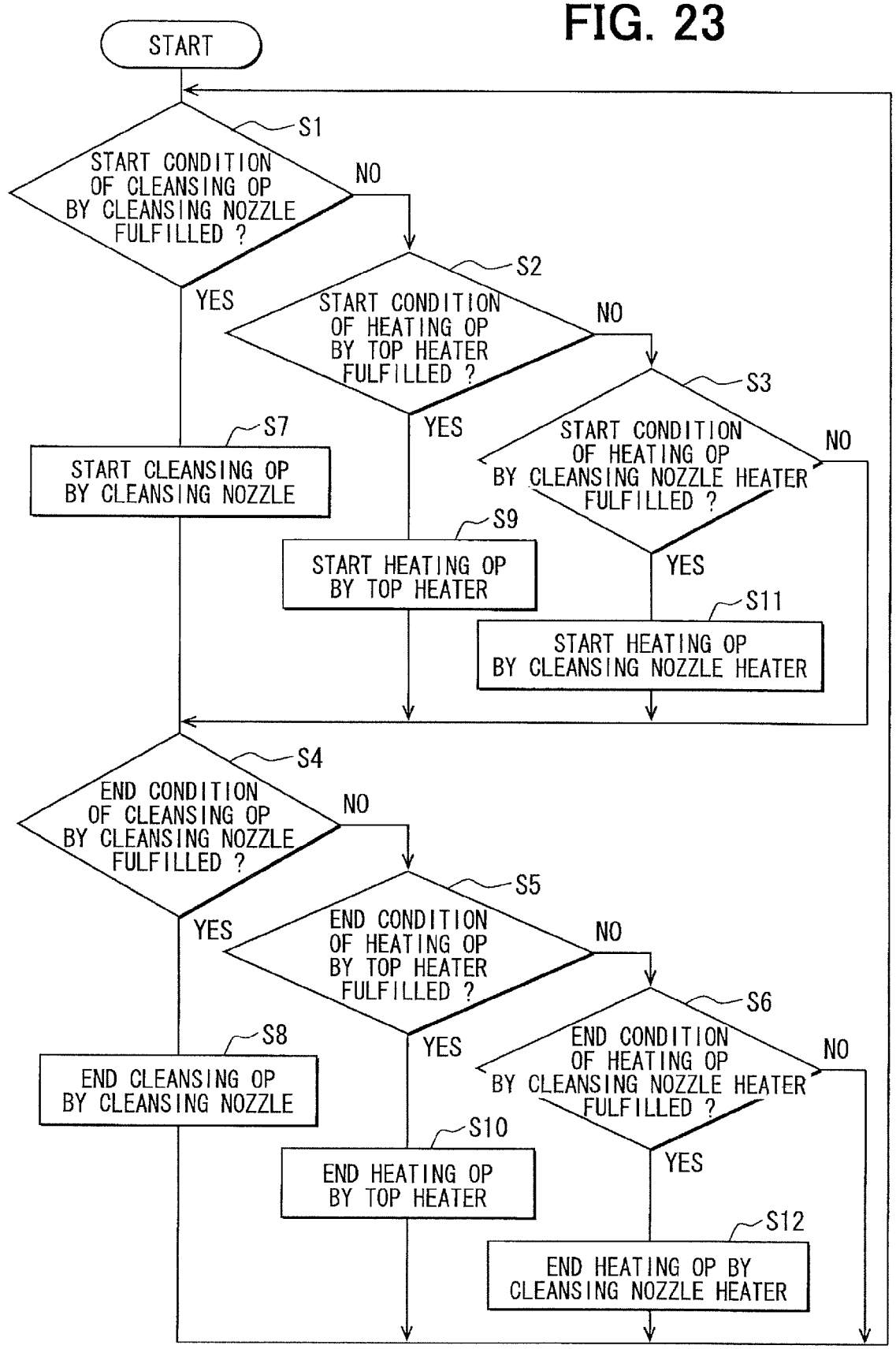
FIG. 23 shows a flowchart of a process in the optical sensor device.

The operation of the above configuration is explained referring to FIG. 23.

The control unit 19 determines, in a power on condition (i.e., in a start-up condition of the optical sensor unit 1), whether a start condition and an end condition are fulfilled respectively about the cleansing operation by the cleansing nozzle 9, the heating operation by the upper surface heater 114, and the heating operation by the cleansing nozzle heater 115 (steps S1 to S6).

When the control unit 19 determines that a start condition of the cleansing operation by the cleansing nozzle 9 is fulfilled (step S1, YES), it outputs the drive instruction signal to the motor 21 for driving the motor 21, and the cleansing operation by the cleansing nozzle 9 is started (step S7). More practically, when the control unit 19 determines that, for example, an operation detection signal is input from the cleansing switch 23 according to a user operation of the cleansing switch 23, it determines that the start condition of the cleansing operation by the cleansing nozzle 9 is fulfilled, and the cleansing operation by the cleansing nozzle 9 is started. In this case, the cleansing fluid stored in to cleaning fluid tank 20 is supplied to the cleansing nozzle 9, and it is jetted toward the lens surface 5a of the lens 5 of the camera 3 from the orifice 12.

Then, the cleansing operation by the cleansing nozzle 9 is finished (step S8) when the control unit 19 determines that an end condition of the cleansing operation by the cleansing nozzle 9 is fulfilled (step S4, YES) after the cleansing operation by the cleansing nozzle 9 is started. More practically, when the control unit 19 determines that, for example, an operation detection signal from the cleansing switch 23 according to a user operation of the cleansing switch 23 is input again, or determines that a predetermined time has passed after the starting the cleansing operation, or determines that jetting of the cleansing fluid has reached to a predetermined quantity, it determines that the end condition of the cleansing operation by the cleansing nozzle 9 is fulfilled, and the cleansing operation by the cleansing nozzle 9 is finished.

Further, when the control unit 19 determines that a start condition of the heating operation by the upper surface heater 114 is fulfilled (step S2, YES), it drives the heater 114 by outputting the drive instruction signal to the heater 114 for starting the heating operation by the heater 114 (step S9). More practically, when, for example, the control unit 19 determines that an input of an operation detection signal from the upper surface heater switch 24 according to the user operation of the switch 24 is detected, or determines that turning on of the ACC switch and the IG switch according to a signal input from the in-vehicle LAN interface region 27 is detected, or determines that the temperature of the body 6 of the camera cover 2 below a predetermined value is detected according to a temperature measurement signal input from the device thermometer 26, or determines that an accumulation of snow on the upper surface 13 of the body 6 of the camera cover 2 is detected according to an image displayed on the liquid crystal display device 22, the control unit 19 determines that the start condition of the heating operation by the upper surface heater 114 is fulfilled, and outputs the drive instruction signal to the upper surface heater 114 for driving the upper surface heater 114, and the heating operation by the upper surface heater 114 is started. In this case, when the heating operation by the upper surface heater 114 is started, heat from the heater 114 is transmitted to the upper surface 13 of the body 6, and toward the outside of the upper surface 13 concerned.

Then, the heating operation by the upper surface heater 114 is finished (step S10) when the control unit 19 determines that the end condition of the heating operation by the upper surface heater 114 is fulfilled (step S5, YES) after starting of the heating operation by the upper surface heater 114. More practically, when the control unit 19 determines that, for example, according to detection of a user operation of the upper surface heater switch 24 again, an operation detection signal from the upper surface heater switch 24 is input again, or determines that a predetermined time has passed after starting the heating operation by the upper surface heater 114, or determines that the ACC switch or the IG switch is turned off according to a signal input from the in-vehicle LAN interface unit 27, or determines that the temperature of the body 6 of the camera cover 2 higher than a predetermined value is detected according to a temperature measurement signal input from the device thermometer 26, or determines that an accumulation of snow on the upper surface 13 of the body 6 of the camera cover 2 is melted according to an image displayed on the liquid crystal display device 22, it determines that the end condition of the heating operation by the heater 114 is fulfilled, and the heating operation by the heater 114 is finished.

Further, when the control unit 19 determines that a start condition of the heating operation by the cleansing nozzle heater 115 is fulfilled (step S3, YES), it drives the heater 115 by outputting the drive instruction signal to the heater 115 for starting the heating operation by the heater 115 (step S11). More practically, When the control unit 19 determines that, for example, an input of an operation detection signal from the cleansing nozzle heater switch 25 according to a user operation of the cleansing nozzle heater switch 25 is detected, it determines that a start condition of the heating operation by the cleansing nozzle heater 115 is fulfilled, and outputs the drive instruction signal to the cleansing nozzle heater 115 for driving the cleansing nozzle heater 115, and the heating operation by the cleansing nozzle heater 115 is started. After the start of the heating operation, heat from the heater 115 is transmitted to the cleansing nozzle 9, and further to the cleaning fluid flowing in the cleansing nozzle 9.

Then, the heating operation by the cleansing nozzle heater 115 is finished (step S12) when the control unit 19 determines an end condition of the heating operation by the cleansing nozzle heater 115 is fulfilled (step S6, YES) after starting the heating operation by the cleansing nozzle heater 115. More practically, when the control unit 19 determines that, for example, an input of an operation detection signal from the cleansing nozzle heater switch 25 according to a user operation of the cleansing nozzle heater switch 25 is detected again, it determines that an end condition of the heating operation by the cleansing nozzle heater 115 is fulfilled, and the heating operation by the cleansing nozzle heater 115 is finished.

In the above, the start/end condition of the heating operation by using the upper surface heater switch 24 and the start/end condition of the heating operation by using the cleansing nozzle heater switch 25 are respectively different. However, the start/end condition of the heating operation by using the upper surface heater switch 24 and the start/end condition of the heating operation by using the cleansing nozzle heater switch 25 may be the same condition, or the upper surface heater 114 and the cleansing nozzle heater 115 may cooperate. Further, the cleansing operation by the cleansing nozzle 9 may be started after finishing the heating operation by using the upper surface heater switch 24.

As described in the above, according to the present embodiment, foreign matter on the lens surface 5a is removed by the cleansing operation by the cleansing nozzle 9, because the cleansing nozzle 9 for jetting the cleansing fluid toward the lens surface 5a of the lens 5 of the camera 3 from the cleaning fluid tank 20 is provided in the camera cover 2 to which the camera 3 is detachably installed, and because the upper surface heater 114 heating the upper surface 13 of the body 6 of the camera cover 2 is provided. In addition, the accumulation of snow on the upper surface 13 of the body 6 is prevented, and attachment and/or covering of the lens surface 5a by snow or ice is prevented, by heat dissipated from the upper surface 13 of the body 6, thereby preventing snow or ice to obstruct the sight of the camera 3.

In addition, because the cleansing nozzle heater 115 heating the cleansing nozzle 9 is provided, the cleaning fluid flowing in the nozzle 9 is heated before it is jetted from the nozzle 9 toward the lens surface 5a for cleansing. Therefore, snow or ice on the lens surface 5a is melted and removed, and foggy lens surface 5a is cleared.

In addition, by starting the cleansing operation by the cleansing nozzle 9 after finishing of the heating operation by the upper surface heater switch 24, a drop of water on the lens surface 5a is removed even when the drop of water comes from melted snow or ice due to the heating operation by the upper surface heater 114. Furthermore, the camera 3 only can be easily replaced because the camera 3 is detachably installed in the camera cover 2.

Fifth Embodiment

The fifth embodiment of the present invention is explained in the following referring to FIGS. 24A to 25. For the same portion as the fourth embodiment, explanation is omitted, and only the difference from the fourth embodiment is explained in detail. While the fourth embodiment has two separate heaters 114 and 115 for respectively heating the upper surface 13 of the body 6 of the camera cover 2 and the cleansing nozzle 9, in the fifth embodiment, a heater heating the upper surface of the body of the camera cover and a heater heating a cleansing nozzle are configured to have a single body.

As shown in FIGS. 24A/24B, an inside of a lower part of a body 33 of a camera cover 32 in an optical sensor unit 31 is configured to be a camera housing 34 to house the camera 3, and an inside of an upper part is configured to be a cleansing nozzle housing 35 to house the cleansing nozzle 9. A heater 136 is disposed to contacts with a back side of an upper surface 37 of the body 33 and, at the same time, circles around the cleansing nozzle 9. The heater 136 is provided as a heating wire, and serves as both of the upper surface heater 114 and the cleansing nozzle heater 115 explained in the fourth embodiment, to dissipate heat that is to be transmitted to and to be dissipated from the upper surface 37 of the body 33 toward an outside of the body 33 and toward the cleansing fluid flowing in the cleansing nozzle 9.

Figure 25:
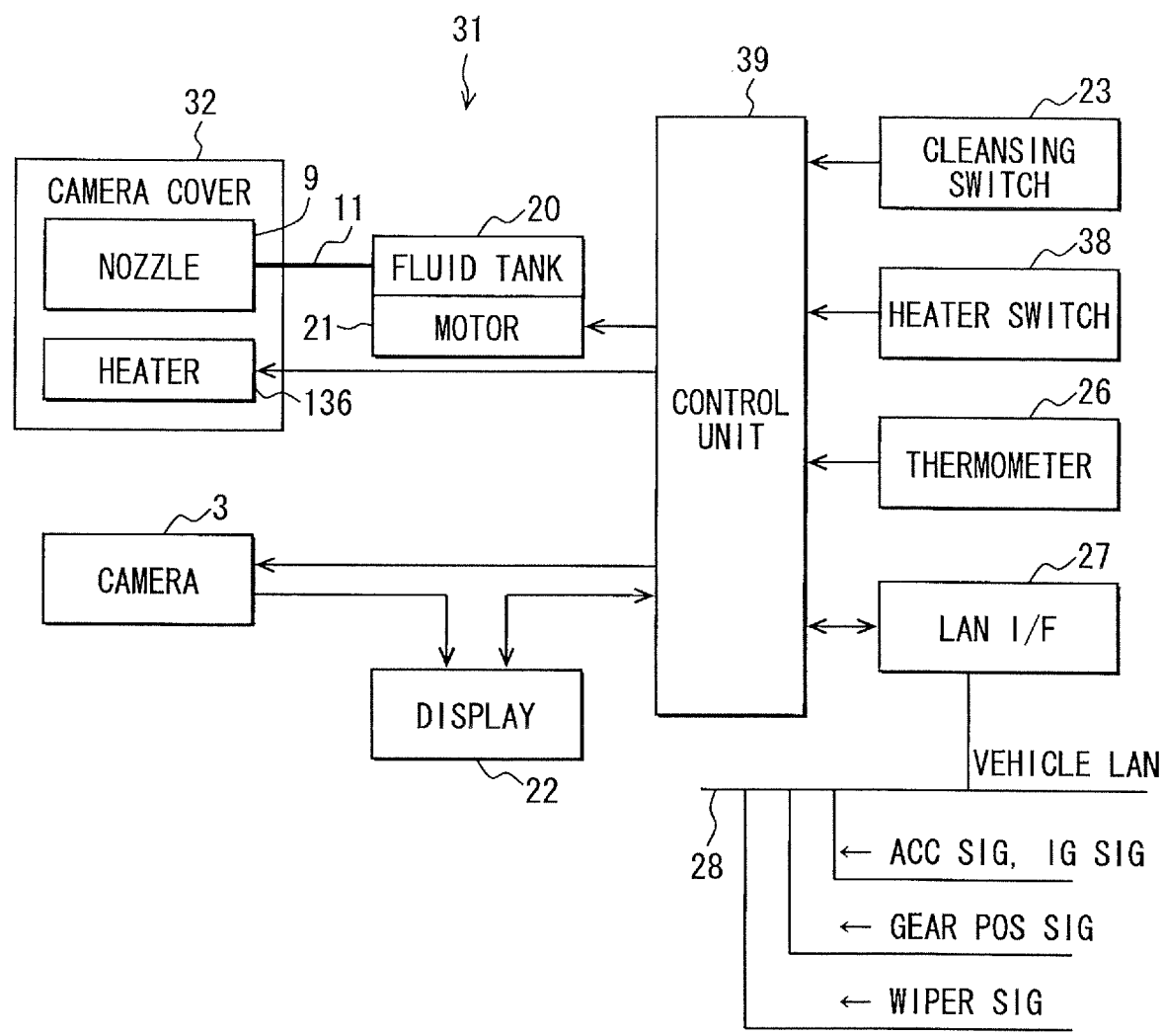
FIG. 25 shows another function block diagram of the optical sensor device in the fifth embodiment, corresponding to FIG. 21.

When the heater 114 and the heater 115 in the fourth embodiment are configured to be provided as one heater 136, the upper surface heater switch 24 and the cleansing nozzle heater switch 25 in the fourth embodiment are configured to be provided as one heater switch 38, for driving the heater 26 upon having a drive instruction signal from a control unit 39 that has detected an input of an operation detection signal from the heater switch 38, for heating the upper surface 37 of the body 33 and the cleansing nozzle 9 at the same time, as shown in FIG. 25.

As explained above, the heater 136 in the present embodiment is configured to heat the upper surface 37 of the body 33 of the camera cover 32 and the cleansing nozzle 9 at the same time, the number of components used to heat the upper surface 37 of the body 33 of the camera cover 32 and the cleansing nozzle 9 is decreased, in comparison to the configuration in the fourth embodiment.

Sixth Embodiment

The sixth embodiment of the present invention is explained in the following referring to FIGS. 26A to 27. For the same portion as the fourth embodiment, explanation is omitted, and only the difference from the fourth embodiment is explained in detail. While the fourth embodiment has a level upper surface 13 as the body 6 of the camera cover 2, the upper surface of the body of the camera cover in the present embodiment is slanted.

As shown in FIGS. 26A/26B, an inside of a lower part of a body 43 of a camera cover 42 in an optical sensor unit 41 is configured to be a camera housing 44 to house the camera 3, and an inside of an upper part is configured to be a cleansing nozzle housing 45 to house the cleansing nozzle 9. An upper surface 46 of the body 43 slants down from the back side of the body 43 toward the front side. In addition, a heater 147 serving as the upper surface heater 114 of the fourth embodiment is buried in the upper surface 46 of the body 43 of the camera cover 42, and the cleansing nozzle heater 115 is provided to circle around the cleansing nozzle 9.

Figure 27:
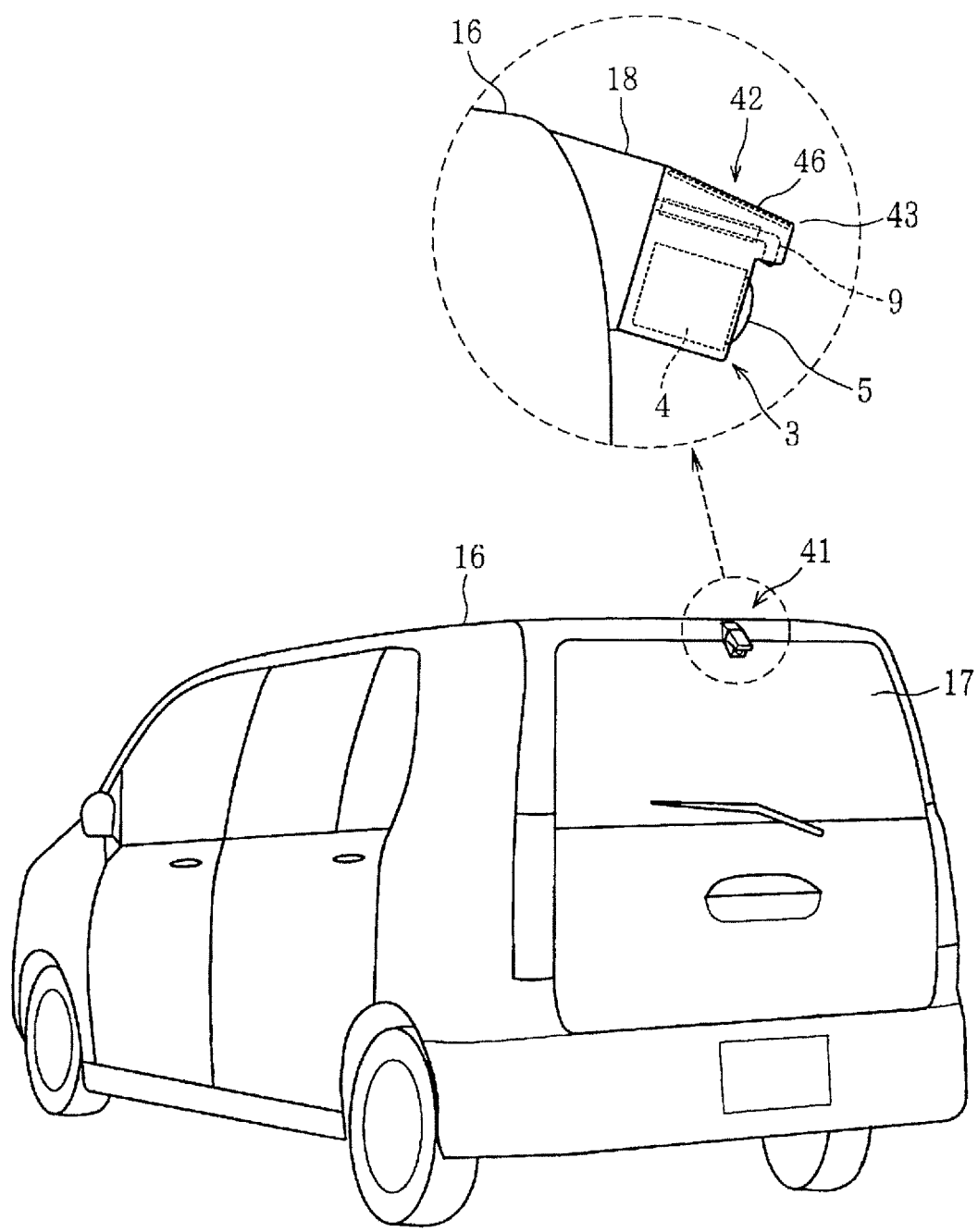
FIG. 27 shows another perspective view of the optical sensor device in a vehicle-installed condition, corresponding to FIG. 20.

The optical sensor unit 41 is, as shown in FIG. 27, installed at an upper end of the rear window 17 of the vehicle body 16 by using the fitting metal 18, for example, allowing the camera 3 to have a downward viewing direction relative to a level direction to have a back side view of the vehicle body 16. In this case, a slant angle of the upper surface 46 of the body 43 of the camera cover 42 relative to a horizontal direction is greater than a slant angle of the upper surface 13 of the body 6 of the camera cover 2 in the fourth embodiment, thereby making it difficult for snow to be accumulated on the upper surface 46 of the body 43, and/or making it extremely easy for accumulated snow to be removed from the upper surface 43 of the body 43 after melting.

As explained above, the upper surface 46 of the body 43 of the camera cover 42 slants down from the back side toward the front side in the sixth embodiment, the snow is difficult to be accumulated on the upper surface 46 of the body 43 and/or the melted snow on the surface 46 is easy to be removed therefrom. In this case, even when the camera 3 is installed to capture a right back direction (i.e., a horizontal direction) of the vehicle body 16, the upper surface 46 of the body 43 is made it difficult to have an accumulated snow, or is made it easy to remove the accumulated snow therefrom after melting.

Modification of the Fourth to Sixth Embodiments

The present invention is not necessarily limited to the above embodiments, but may be modified or expanded into the following forms.

The optical sensor may be a device other than the camera 3, as long as it has a lens and can optically measure a physical quantity, such as laser sensors or the like.

As the start condition of the optical sensor cleansing operation, the following conditions may be included. That is, detection of a gear shift into a rear (backing) position, detection of wiper operation, detection of an attached object in an image may be used as the start condition. Further, these conditions may be used as a combination.

The camera cover may have a weight sensor for detecting a weight on the upper surface of the body of the camera cover, and the detected weight on the upper surface exceeding a threshold may start the heating operation by the upper surface heater switch, and the detected weight on the upper surface below the threshold may end the heating operation by the upper surface heater switch.

A curved surface may be provided as the upper surface of the body of the camera cover, for making it hard for snow to be accumulated on the upper surface of the body 6, or for making it easy for snow on the upper surface to be removed.

By counting the number of times of the cleansing operation and by determining that the foreign matter is not removed after a predetermined times of cleansing operation or after a predetermined duration of cleansing operation, the unsuccessful cleansing operation may be notified for the user. The notification of unsuccessful cleansing operation may be performed as a display of information screen on a display unit, or a guidance sound may be output from a speaker (not illustrated), or a vibration/electrical stimulation may be provided from a steering wheel or from a seat having a vibration/electrical stimulation generator. Further, different types of notification may be combined. That is, at least one of visual sensation, hearing sensation, or tactile sensation may be employed for notification.

The lens surface of the lens of the camera may have a treatment such as a water-repellant treatment, a hydrophilic treatment, a photocatalyst treatment, or an antifouling treatment, to have a water-repellant coating, a hydrophilic coating, a photocatalyst coating, or an antifouling coating. In this manner, the lens surface may be prevented from having foreign matter attached thereon, and/or the lens surface may be appropriately washed even when foreign matter is attached on the lens surface.

The body of the camera cover may have a window wash nozzle in parallel with the cleansing nozzle, and the cleansing fluid may be provided for the window wash nozzle from the cleansing fluid tank through a tube, and the cleansing fluid provided for the window wash nozzle may be jetted from an orifice toward a window. In this manner, in addition to cleansing the lens surface of the lens of the camera, the window is washed, as a multi-functioning. In this case, the window wash fluid may be separately provided from a window wash fluid tank that is provided as a different tank from the cleansing fluid tank. Further, the orifice of the cleansing nozzle may be moved to change the jetting direction of the cleansing fluid, for alternatively performing the lens cleansing operation to jet the cleansing fluid toward the lens surface of the camera lens and to jet the cleansing fluid toward the window.

A tray and a tube may be provided in the body of the camera cover, and the jetted fluid may be received by the tray and drained by the tube, after the fluid is jetted toward the lens surface of the lens of the camera from the orifice of the cleansing nozzle, and dripping cleansing fluid from the lens surface is received with a tray. In this manner, a window is prevented from being covered by dripping cleansing fluid. The cleansing fluid dripping from the lens surface 5a may be directed toward the window by providing a hole in the tray.

As shown in FIGS. 28A/28B, a protrusion 53 may be provided at a portion near a lower end of the lens surface 5a of the lens 5 of the camera 3 in a body 52 of a camera cover 51. In this manner, the water drops staying at the lower end of the lens surface 5a are guided downward by a touch of the protrusion to be removed. Further, as shown in FIGS. 29A/29B, a protrusion 63 may be provided at a portion near a lower end of the lens surface 5a of the lens 5 of the camera 3 in a body 62 of a camera cover 61, and the protrusion 63 may be configured to be slidable in an up-down direction along a gutter 64. In this manner, by sliding the protrusion 3 up and down, the protrusion 63 may be flexibly fitted to various lenses having different curvatures and or different radii.

Figure 30A:
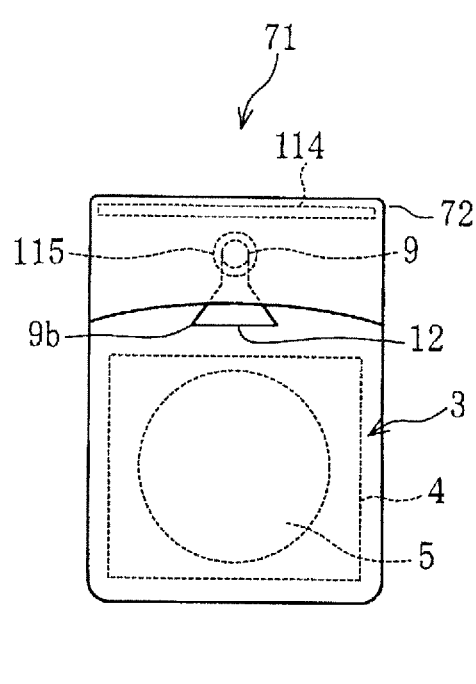
FIGS. 30A/30B show still yet other illustrations of (a) a front face and (b) a cross section of a side face of an optical sensor device in modification of the fourth to sixth embodiments of the present invention corresponding to FIGS. 28A/28B.
Figure 30B:
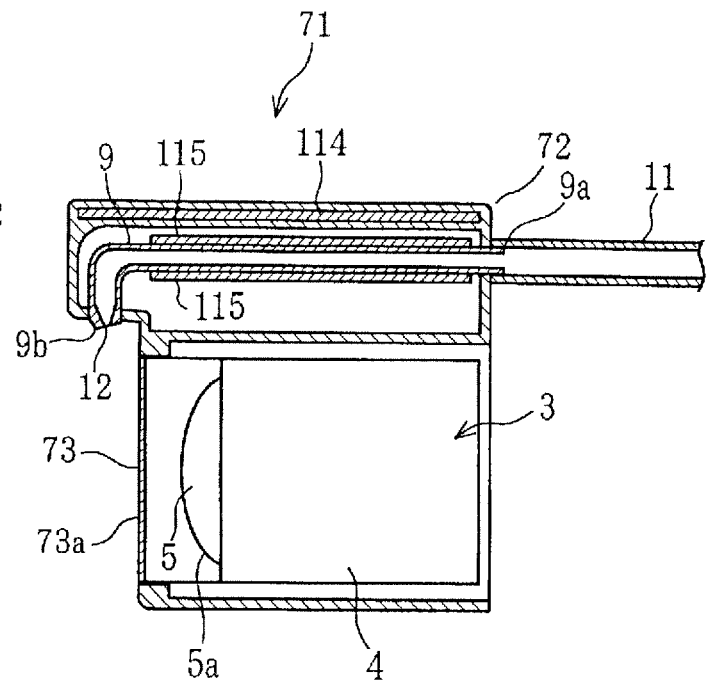

As shown in FIGS. 30A/30B, a body 72 of a camera cover 71 may have the heater 114 and the heater 115 of the fourth embodiment, and a front side of the body 72 may have a cover glass 73 made of a transparent member facing the lens 5 of the camera 3, and the cleansing fluid may be provided from the cleansing fluid tank 20 through the tube 11 to the cleansing nozzle 9, and may be jetted toward a glass surface 73a of the cover glass 73 from the orifice 12. In this manner, the lens 5 of the camera 3 is covered by the cover glass 73, and foreign matter on the glass surface 73a is appropriately removed therefrom by the jetted cleansing fluid. In this case, the camera 3 is housed in the cover 71 as a whole, the dimension of the cover 71 in a front-rear direction is increased in comparison to the body 6 of the fourth embodiment.

As shown in FIGS. 31A/31B, the heater 136 of the fifth embodiment may be provided in a body 82 of a camera cover 81, and a front side of the body 82 may have a cover glass 83 made of a transparent member facing the lens 5 of the camera 3. Further, as shown in FIGS. 32A/32B, the heater 147 and the cleansing nozzle heater 115 of the sixth embodiment may be provided in a body 92 of a camera cover 91, and a front side of the body 92 may have a cover glass 93 made of a transparent member facing the lens 5 of the camera 3.

In the configuration that the cover glass faces the lens of the camera, the glass surface of the cover glass may have a treatment such as a water-repellant treatment, a hydrophilic treatment, a photocatalyst treatment, or an antifouling treatment, to be covered by a water-repellant coating, a hydrophilic coating, a photocatalyst coating, or an antifouling coating.

A wiper for wiping the glass surface of the cover glass may be provided in the body of the camera cover, and during/after the cleansing operation for jetting the cleansing fluid from the orifice of the cleansing nozzle toward the glass surface, the glass surface of the cover glass may be wiped. In this manner, the cleansing fluid is not left attached on the glass surface of the cover glass.

A rotation mechanism for rotating the cover glass may be provided in the body of the camera cover, and during/after the cleansing operation for jetting the cleansing fluid from the orifice of the cleansing nozzle toward the glass surface, the glass surface of the cover glass may be rotated. In this manner, the cleansing fluid on the glass surface is flown off from the glass surface by the rotation of the cover glass, and the cleansing fluid is prevented from being left attached on the glass surface of the cover glass. In this case, in order to preserve an expected fly-off effect for rotational removing of the cleansing fluid by avoiding interference to the rotation of the cover glass by a touch of the human body, the rotation of the cover glass by the rotation mechanism may only be allowed on condition that the speed of the vehicle is equal to or above a predetermined speed (e.g., more than 1 km/h) or that a window is closed.

In other words, under the above condition, due to the travel of the vehicle, a person outside of the vehicle cannot inadvertently touch the cover glass. Therefore, by rotating the cover glass by the rotation mechanism only when the vehicle is traveling at a certain speed, the deterioration of the fly-off effect for removing the cleansing fluid due to the touch of a person outside of the vehicle is prevented. Further, if the cover glass is disposed at a position that is susceptible to the touch of an occupant of the vehicle, such as a door mirror or the like, it may be useful to prevent the tough on the cover glass by the occupant. That is, the cover glass may only be rotated when the window is closed, for preventing interference to the rotation of the cover glass by the occupant. In this case, the window may not necessarily be completely closed. In other words, the window may only be closed up to a degree that prevents the occupant to stick out the body from the window and touch the cover glass. By devising such condition for the rotation of the cover glass, the outside air may be introduced though opening of the window, as required. How to define a suitable window closure condition may be arbitrarily be decided according to the position of the cover glass and the occupant position, that is, to what degree he/she can stick the body out from the window.

A vibration mechanism to vibrate the cover glass may be provided, and during/after the cleansing operation for jetting the cleansing fluid from the orifice of the cleansing nozzle toward the glass surface, the glass surface of the cover glass may be vibrated. In this manner, the cleansing fluid is not left attached on the glass surface of the cover glass.

An air jetting mechanism may be provided in the body of the camera cover, and air may be jetted from the air jetting mechanism during/after the cleansing operation for jetting the cleansing fluid from the orifice of the cleansing nozzle toward the glass surface of the cover glass. In this case, too, the cleansing fluid is not left attached on the glass surface of the cover glass.

In case that the camera has an infrared lighting device for emitting an infrared light in the same body, the cleansing fluid may be jetted toward the infrared light at the same time as the fluid is jetted toward the lens surface of the lens of the camera from the tank for storing the fluid. In this manner, the infrared light is suitably emitted therefrom. The infrared lighting device may be replaced with a visible light emitting device.

The optical sensor unit may be disposed on both sides of the vehicle, under side mirrors, instead of being disposed at a position above the rear window of the vehicle body, for capturing an image of the back of the vehicle. That is, multiple cameras may be used as the optical sensor unit.

In the above embodiments, the control unit and the optical sensor unit are included as indispensable elements of the vehicle optical sensor device. However, the control unit may be configured as a part of the camera cover.

Such changes, modifications, and summarized scheme are to be understood as being within the scope of the present disclosure as defined by appended claims.

What is claimed is:

1. A vehicle optical sensor cover comprising:
a case having a sensor body cover and a sensor top cover, the sensor body cover housing an optical sensor and a lens arranged in front of the optical sensor;
the sensor top cover being arranged above and covering the sensor body cover, the optical sensor and the lens, the sensor top cover including an eaves-shaped overhang that is arranged above the lens and the optical sensor that protrudes outwardly from the sensor body cover; and
a fluid jet unit being arranged within the sensor top cover and having a snow/ice removal orifice arranged in the eaves-shaped overhang, the snow/ice removal orifice being configured to jet a fluid upward toward an area defined by an upper space of the sensor top cover.

2. The vehicle optical sensor cover of claim 1, wherein
the snow/ice removal orifice also jets the fluid toward an area that is outside of an imaging angle of the optical sensor.

3. A vehicle optical sensor cover comprising:
a case having a sensor body cover and a sensor top cover, the sensor body cover housing an optical sensor that has a lens and the sensor top cover covering a top of the optical sensor that is housed in the sensor body cover; and
a fluid jet unit having a snow/ice removal orifice and an optical sensor cleansing orifice, the snow/ice removal orifice jetting a fluid toward an upper space of the sensor top cover, and the optical sensor cleansing orifice jetting the fluid toward the lens of the optical sensor or toward the lens cover glass that opposes the lens, wherein
the snow/ice removal orifice is disposed at a tip of an eaves-shaped portion of the sensor top cover protruding from a lens surface of the lens of the optical sensor or from a glass surface of the lens cover glass.

4. The vehicle optical sensor cover of claim 3, wherein
the snow/ice removal orifice jets the fluid toward an area that is (a) in the upper space of the lens or the lens cover glass and (b) in an upper space of the sensor top cover.

5. The vehicle optical sensor cover of claim 3, wherein
the fluid jet unit has one fluid passage commonly used for the fluid jetted from the optical sensor cleansing orifice and for the fluid jetted from the snow/ice removal orifice.

6. The vehicle optical sensor cover of claim 5, wherein
the fluid jet unit includes a jet pressure adjustment unit for adjusting a pressure of the fluid jetted from the optical sensor cleansing orifice and a pressure of the fluid jetted from the snow/ice removal orifice.

7. The vehicle optical sensor cover of claim 5, wherein
the fluid jet unit has one fluid passage for the fluid jetted from the optical sensor cleansing orifice and another fluid passage separately for the fluid jetted from the snow/ice removal orifice.

8. A vehicle optical sensor device comprising:
the vehicle optical sensor cover of claim 3, and
a control unit for controlling:
an optical sensor cleansing operation for jetting the fluid from the optical sensor cleansing orifice of the fluid jet unit toward a lens surface of the lens or a glass surface of the lens cover glass; and
a snow/ice removal operation for jetting the fluid from the snow/ice removal orifice of the fluid jet unit toward at least one of the upper space of the lens and the upper space of the lens cover glass.

9. The vehicle optical sensor device of claim 8, wherein the control unit controls the fluid jet unit for separately performing the optical sensor cleansing operation and the snow/ice removal operation.

10. The vehicle optical sensor device of claim 9 further comprising at least one of:
a start operation detection unit for detecting a start operation for starting the snow/ice removal operation by a user;
a vehicle start-up detection unit for detecting a start-up of a vehicle;
a temperature detection unit for detecting temperature of ambient air or the optical sensor; and
an obstruction detection unit for detecting ice or snow on the sensor top cover which obstructs a sight of the optical sensor based on an analysis of an image taken by the optical sensor, wherein
the control unit starts the snow/ice removal operation by the fluid jet unit when at least one of the start operation of the snow/ice removal operation, the start-up of the vehicle, the temperature of the ambient air or the optical sensor being lower than a preset value, or the ice or snow existing as an obstruction in the sight of the optical sensor is detected.

11. The vehicle optical sensor device of claim 10 further comprising at least one of:
an end operation detection unit for detecting an end operation for ending the snow/ice removal operation by a user;
a vehicle start-up completion detector for detecting completion of a start-up of the vehicle;
a timer for detecting a lapse of preset time from a start of the snow/ice removal operation, wherein
the control unit ends the snow/ice removal by the fluid jet unit when at least one of the end operation of the snow/ice removal operation, the completion of the start-up of the vehicle, the temperature of the ambient air or the optical sensor being higher than a preset value, disappearance of the ice or the snow once detected by the obstruction detection unit, or the lapse of the preset time from a start of the snow/ice removal operation is detected.

12. The vehicle optical sensor device of claim 9, wherein the control unit starts the optical sensor cleansing operation after starting the snow/ice removal operation.

13. A vehicle optical sensor cover for use in a vehicle, comprising:
a sensor case having a sensor body cover and a sensor top cover, the sensor body cover housing an optical sensor that has a lens and the sensor top cover covering a top of the optical sensor that is housed in the sensor body cover;
a fluid jet unit having a snow/ice removal orifice and an optical sensor cleansing orifice, the snow/ice removal orifice jetting a fluid toward an upper space of the sensor top cover, and the optical sensor cleansing orifice jetting the fluid toward the lens of the optical sensor or toward the lens cover glass that opposes the lens, and
a top heater for heating the sensor top cover of the sensor case, wherein
the snow/ice removal orifice is disposed at a tip of an eaves-shaped portion of the sensor top cover protruding from a lens surface of the lens of the optical sensor or from a glass surface of the lens cover glass.

14. The vehicle optical sensor cover of claim 13 further comprising:
a cleansing nozzle being arranged in the sensor case for jetting a cleansing fluid that is supplied from a cleansing fluid tank, wherein
the cleansing fluid is jetted toward the lens of the optical sensor, or toward a lens cover glass that opposes the lens as a lens cover when the lens cover glass is provided.

15. The vehicle optical sensor cover of claim 13, wherein the sensor top cover of the sensor case is installed in the vehicle and is formed in a shape that has a slant portion or a curved portion slanting from a level.

16. The vehicle optical sensor cover of claim 15, wherein the cleansing nozzle is disposed close to the sensor top cover, and
the top heater heats both of the sensor top cover and the cleansing nozzle.

17. The vehicle optical sensor cover of claim 15 further comprising:
a nozzle heater for heating the cleansing nozzle provided separately from the top heater.

18. A vehicle optical sensor device for use in a vehicle comprising:
the vehicle optical sensor cover of claim 14;
a controller for controlling a cleansing operation by the cleansing nozzle and a heating operation by the top heater; and
a lens of the optical sensor.

19. The vehicle optical sensor device of claim 18 further comprising:
a vehicle start-up detection unit for detecting a start-up of the vehicle, wherein
the controller starts a heating operation by the top heater when the start-up of the vehicle is detected by the vehicle start-up detection unit.

20. The vehicle optical sensor device of claim 19 further comprising:
a vehicle start-up completion detection unit for detecting completion of the start-up of the vehicle, wherein
the controller continues the heating operation by the top heater after starting the heating operation in response to the detection of the start-up of the vehicle by the vehicle start-up detection unit, until the completion of the start-up of the vehicle detected by the vehicle start-up completion detection unit.

21. The vehicle optical sensor device of claim 19 further comprising:
a timer for detecting a lapse of preset time from a start of the heating operation by the top heater, wherein
the controller continues the heating operation by the top heater after starting the heating operation in response to the detection of the start-up of the vehicle by the vehicle start-up detection unit, until the lapse of the preset time from the start of the heating operation is detected by the timer.

22. The vehicle optical sensor device of claim 18 further comprising:
a temperature detection unit for detecting temperature of ambient air or the optical sensor, wherein
the controller starts the heating operation by the top heater when the temperature detected by the temperature detection unit is lower than a preset value.

23. The vehicle optical sensor device of claim 22, wherein the controller continues the heating operation by the top heater after starting the heating operation in response to the temperature detected by the temperature detection unit to be lower than the preset value, until the temperature detected by the temperature detection unit is equal to or higher than the preset value.

24. The vehicle optical sensor device of claim 22 further comprising:
- a timer for detecting a lapse of preset time from a start of the heating operation by the top heater, wherein
- the controller continues the heating operation by the top heater after starting the heating operation in response to the temperature detected by the temperature detection unit to be lower than the preset value, until the lapse of the preset time from the start of the heating operation is detected by the timer.

25. The vehicle optical sensor device of claim 18 further comprising:
- an image analyzer for analyzing an image that is taken by the optical sensor; and
- an accumulation detection unit for detecting an accumulation of snow or ice on the top of the sensor case based on a result of the analysis of the image by the image analyzer, wherein
- the controller starts the heating operation by the top heater when the accumulation of snow or ice on the sensor top cover of the sensor case is detected by the accumulation detection unit.

26. The vehicle optical sensor device of claim 25, wherein the controller continues the heating operation by the top heater after detecting the accumulation of snow or ice on the sensor top cover of the sensor case by the accumulation detection unit, until the accumulation of snow and ice is not detected by the accumulation detection unit.

27. The vehicle optical sensor device of claim 25 further comprising:
- a timer for detecting a lapse of preset time from a start of the heating operation by the top heater, wherein
- the controller continues the heating operation by the top heater after starting the heating operation in response to the accumulation of snow or ice detected by the accumulation detection unit, until the lapse of the preset time from the start of the heating operation of the top heater is detected by the timer.

28. The vehicle optical sensor device of claim 18, wherein the controller starts the cleansing operation by the cleansing nozzle after starting the heating operation by the top heater.

* * * * *